United States Patent
Inoue

(10) Patent No.: US 11,855,687 B2
(45) Date of Patent: Dec. 26, 2023

(54) OPTICAL COMMUNICATION SYSTEM, OPTICAL COMMUNICATION DEVICE, OPTICAL COMMUNICATION METHOD, AND STORAGE MEDIUM

(71) Applicant: NEC Corporation, Tokyo (JP)

(72) Inventor: Takanori Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/761,261

(22) PCT Filed: Sep. 17, 2020

(86) PCT No.: PCT/JP2020/035169
§ 371 (c)(1),
(2) Date: Mar. 17, 2022

(87) PCT Pub. No.: WO2021/060124
PCT Pub. Date: Apr. 1, 2021

(65) Prior Publication Data
US 2022/0376784 A1 Nov. 24, 2022

(30) Foreign Application Priority Data
Sep. 27, 2019 (JP) .................. 2019-176939

(51) Int. Cl.
*H04B 10/077* (2013.01)
*H04B 10/40* (2013.01)
(Continued)

(52) U.S. Cl.
CPC .......... *H04B 10/077* (2013.01); *H04B 10/40* (2013.01); *H04B 10/50* (2013.01); *H04B 10/506* (2013.01); *H04B 10/572* (2013.01); *H04B 10/60* (2013.01)

(58) Field of Classification Search
None
See application file for complete search history.

(56) References Cited

U.S. PATENT DOCUMENTS 5,777,761 A * 7/1998 Fee ..................... H04J 14/0291
398/1
6,690,884 B1 * 2/2004 Kelty .................. H04B 10/695
714/704
(Continued)

FOREIGN PATENT DOCUMENTS

CN  107925476 A  4/2018
CN  108781115 A  11/2018
(Continued)

OTHER PUBLICATIONS

Extended European Search Report for EP Application No. EP20869982.7 dated on Nov. 11, 2022.
(Continued)

*Primary Examiner* — Darren E Wolf
(74) *Attorney, Agent, or Firm* — Sughrue Mion, PLLC

(57) ABSTRACT

In order to measure the signal quality of each of optical signals transmitted/received via a plurality of transmission lines, an optical communication system 1 is provided with a dummy light source 10 for outputting dummy light, a switching means 20 for outputting the dummy light to a first transmission line 40*a*, and a light-receiving means 30 for acquiring first signal quality from the dummy light received via the first transmission line 40*a*, the switching means 20 switching the output destination of the dummy light from the first transmission line 40*a* to a second transmission line 40*b*, and the light-receiving means 30 acquiring second signal quality from the dummy light received via the second transmission line 40*b*.

6 Claims, 17 Drawing Sheets

(51) Int. Cl.
  *H04B 10/50* (2013.01)
  *H04B 10/60* (2013.01)
  *H04B 10/572* (2013.01)

(56) References Cited

U.S. PATENT DOCUMENTS

| | | | |
|---|---|---|---|
| 2002/0105693 A1 | 8/2002 | Kobayashi et al. | |
| 2003/0081290 A1* | 5/2003 | Kinjo | H04B 10/297 |
| | | | 398/157 |
| 2003/0215231 A1* | 11/2003 | Weston-Dawkes | ................... |
| | | | H04J 14/0238 |
| | | | 398/19 |
| 2010/0027993 A1* | 2/2010 | Yamaguchi | H04J 14/0267 |
| | | | 398/25 |
| 2011/0311216 A1 | 12/2011 | Inoue | |
| 2011/0318021 A1* | 12/2011 | Zhou | H04B 10/65 |
| | | | 375/376 |
| 2015/0086192 A1 | 3/2015 | Sakamoto | |
| 2018/0212707 A1 | 7/2018 | Yamamoto | |
| 2020/0358534 A1 | 11/2020 | Ootaki | |
| 2021/0194616 A1 | 6/2021 | Yamamoto | |

FOREIGN PATENT DOCUMENTS

| | | | |
|---|---|---|---|
| CN | 108886401 A | 11/2018 | |
| EP | 3439200 A1 | 2/2019 | |
| JP | H09-289394 | 11/1997 | |
| WO | 2001/035582 A1 | 5/2001 | |
| WO | 2013/183146 A1 | 12/2013 | |
| WO | 2017/013875 A1 | 1/2017 | |
| WO | 2017/168994 A1 | 10/2017 | |
| WO | WO-2017168994 A1 * | 10/2017 | ........... H04B 10/032 |
| WO | 2019/151067 A1 | 8/2019 | |

OTHER PUBLICATIONS

Rivera Elizabeth et al: "Subsea Open Cables: A Practical Perspective on the Guidelines and Gotchas", Apr. 7, 2019 (Apr. 7, 2019).
International Search Report for PCT Application No. PCT/JP2020/035169, dated Dec. 8, 2020.
English translation of Written opinion for PCT Application No. PCT/JP2020/035169, dated Dec. 8, 2020.
CN Office Action for CN Application No. 202080053562.6, dated Sep. 27, 2023 with English Translation.

\* cited by examiner

OPTICAL COMMUNICATION SYSTEM, OPTICAL COMMUNICATION DEVICE, OPTICAL COMMUNICATION METHOD, AND STORAGE MEDIUM

This application is a National Stage Entry of PCT/JP2020/035169 filed on Sep. 17, 2020, which claims priority from Japanese Patent Application 2019-176939 filed on Sep. 27, 2019, the contents of all of which are incorporated herein by reference, in their entirety.

TECHNICAL FIELD

The present invention relates to an optical communication system, an optical communication device, an optical communication method, and a storage medium that acquire signal quality of an optical signal.

BACKGROUND ART

In a submarine optical cable system, intensity of an optical signal to be output by a transmitting terminal station is adjusted in such a way that the optical signal is received with appropriate signal quality. For this reason, when the system starts an operation, signal quality (e.g., a signal-noise ratio (SNR) or a tilt characteristic) of an optical signal to be received via a transmission line needs to be acquired in order to adjust the optical signal to be output by the transmitting terminal station to appropriate intensity. Technologies related to optical communication are described in PTLs 1 and 2.

CITATION LIST

Patent Literature

[PTL 1] Japanese Unexamined Patent Application Publication No. H9-289394
[PTL 2] International Publication No. WO2013/183146

SUMMARY OF INVENTION

Technical Problem

In recent years, the number of transmission lines being accommodated in a submarine optical cable has been increasing in order to improve transmission capacities. Each of the plurality of transmission lines has different transmission characteristics from one another. For this reason, acquiring signal quality of an optical signal at a time of reception is required with respect to the plurality of transmission lines. However, in recent years, the submarine optical cable may be prepared separately from an optical transmitter and an optical receiver. Thus, when the optical transmitter and the optical receiver are not provided for each of the transmission lines at the start of system operation, it is not possible to acquire signal quality of an optical signal to be received with respect to the plurality of transmission lines.

The present invention has been made in view of the above-described problem and an object of the present invention is to provide an optical communication system and the like being capable of acquiring signal quality of an optical signal to be received with respect to a plurality of transmission lines.

Solution to Problem

An optical communication system according to the present invention includes:
a dummy light source that outputs dummy light;
a switching means for outputting the dummy light to a first transmission line; and
a light-receiving means for acquiring first signal quality according to the dummy light being received via the first transmission line, wherein
the switching means switches an output destination of the dummy light from the first transmission line to a second transmission line, and
the light-receiving means acquires second signal quality according to the dummy light being received via the second transmission line.

Further, an optical communication device according to the present invention includes:
a dummy light source that outputs dummy light; and
a switching means for outputting the dummy light to a first transmission line, wherein
the dummy light source causes a light-receiving means to acquire first signal quality according to the dummy light being transmitted via a first transmission line,
the switching means switches an output destination of the dummy light from the first transmission line to a second transmission line, and
the dummy light source causes the light-receiving means to acquire second signal quality according to the dummy light being transmitted via the second transmission line.

Further, an optical communication method according to the present invention includes:
outputting the dummy light to a first transmission line;
acquiring first signal quality from the dummy light being received via the first transmission line;
switching an output destination of the dummy light from the first transmission line to a second transmission line; and
acquiring second signal quality from the dummy light being received via the second transmission line.

Further, a storage medium according to the present invention stores a program causing a computer of an optical communication system to execute:
a procedure of outputting the dummy light to a first transmission line;
a procedure of acquiring first signal quality from the dummy light being received via the first transmission line;
a procedure of switching an output destination of the dummy light from the first transmission line to a second transmission line; and
a procedure of acquiring second signal quality from the dummy light being received via the second transmission line.

Advantageous Effects of Invention

According to the present invention, signal quality of each of optical signals to be transmitted/received via a plurality of transmission lines can be measured.

EXAMPLE EMBODIMENT

First Example Embodiment

Figure 1:
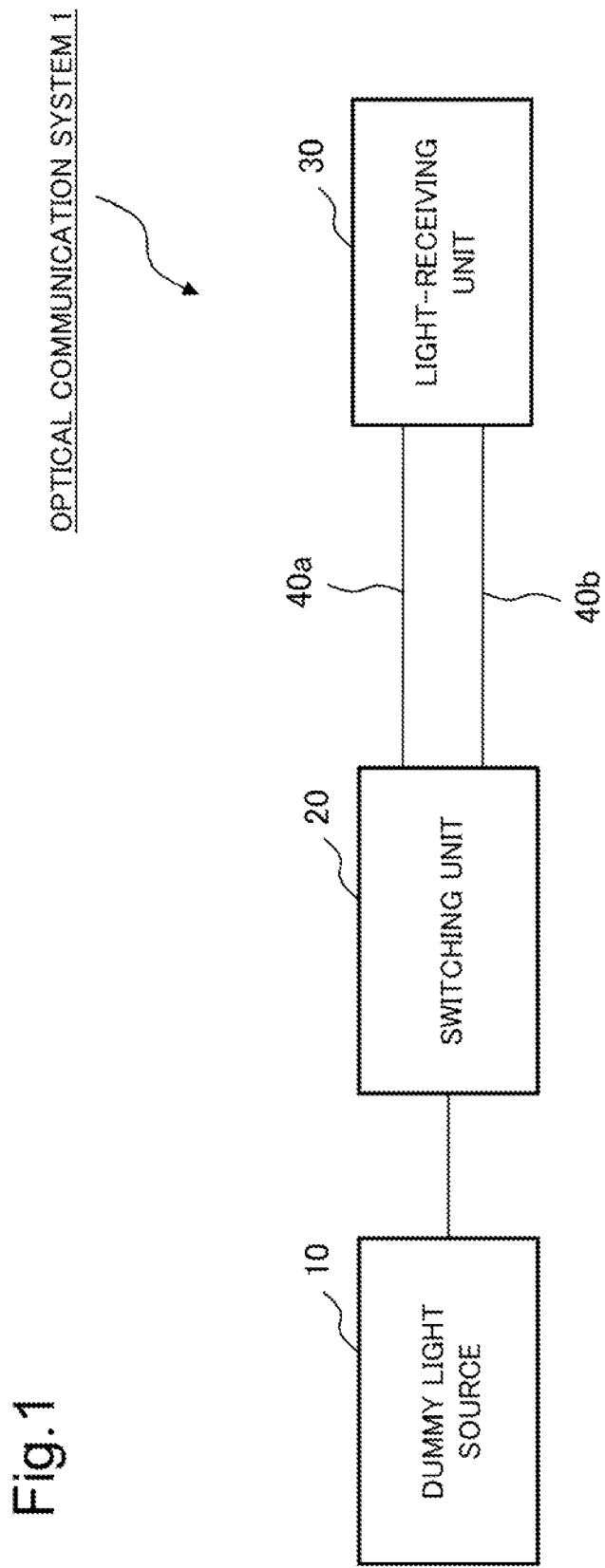
FIG. 1 is a block diagram illustrating a configuration example of an optical communication system according to a first example embodiment of the present invention.
Figure 2:
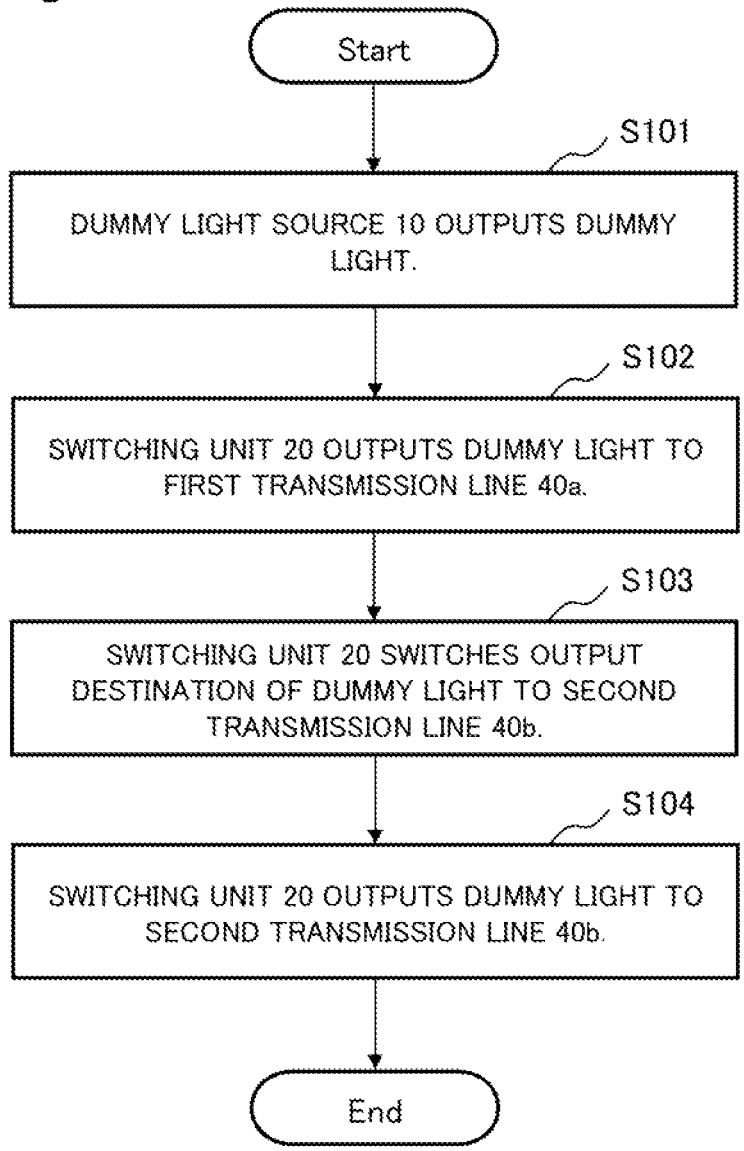
FIG. 2 is a flowchart illustrating an operation example of the optical communication system according to the first example embodiment of the present invention.

An optical communication system 1 according to a first example embodiment is described based on FIGS. 1 and 2. FIG. 1 is a block diagram illustrating a configuration example of the optical communication system 1. FIG. 2 is a flowchart illustrating an operation example of the optical communication system 1.

A configuration of the optical communication system 1 is described. As illustrated in FIG. 1, the optical communication system 1 includes a dummy light source 10, a switching unit 20, a light-receiving unit 30, a first transmission line 40a, and a second transmission line 40b. In the following description, when it is not necessary to distinguish the first transmission line 40a from the second transmission line 40b, each of the first transmission line 40a and the second transmission line 40b is referred to as a transmission line 40.

The dummy light source 10 is described. The dummy light source 10 outputs dummy light. The dummy light includes a plurality of lights having any center wavelength and any bandwidth. The dummy light source 10 includes, for example, an amplified spontaneous emission (ASE) light source and a wavelength selective switch (WSS). The ASE light source includes, for example, an erbium-doped fiber amplifier (EDFA). Inputting excitation light to the EDFA can cause the EDFA to output ASE light. In this case, the ASE light to be emitted from the EDFA is broadband light. Further, the WSS is an optical filter in which an amount of attenuation can be set for each wavelength. By inputting the ASE light being output from the ASE light source to the WSS in which the amount of attenuation is set for each wavelength, dummy light having any intensity for each wavelength is generated. At this time, the light intensity of the dummy light for each wavelength can be adjusted by adjusting the amount of attenuation for each wavelength in the WSS.

As illustrated in FIG. 1, the dummy light source 10 is connected to the switching unit 20. The dummy light being output from the dummy light source 10 is input to either the first transmission line 40a or the second transmission line 40b via the switching unit 20. The dummy light being input to the transmission line 40 is received by the light-receiving unit 30.

The switching unit 20 is described. The switching unit 20 outputs an input optical signal to any line among a plurality of lines. The switching unit 20 is, for example, an optical switch. As illustrated in FIG. 1, the switching unit 20 is connected to the dummy light source 10, the first transmission line 40a, and the second transmission line 40b. The switching unit 20 can output the dummy light being input from the dummy light source 10 to either the first transmission line 40a or the second transmission line 40b.

The light-receiving unit 30 is described. The light-receiving unit 30 receives light and acquires signal quality of the received light. The light-receiving unit 30 is, for example, an optical spectrum analyzer. As illustrated in FIG. 1, the light-receiving unit 30 is connected to the first transmission line 40a and the second transmission line 40b. The light-receiving unit 30 can acquire signal quality of the received dummy light. The signal quality is, for example, SNR.

Herein, the SNR is acquired as follows, for example. It is assumed that a signal component is intensity of the dummy light at the time of reception in each transmission band (hereinafter, referred to as a "transmission band") of the WSS. Further, the intensity of the light generated from an end of the transmission band in the dummy light at the time of reception to an adjacent transmission band is acquired as a noise component. When the transmission band adjacent to both a long wavelength side and a short wavelength side exists, a mean value of the intensity of light generated from one end on the long wavelength side of a specific transmission band to a transmission band adjacent to the long wavelength side and the intensity of light generated from one end on the short wavelength side of a specific transmission band to a transmission band adjacent to the short wavelength side is acquired as a noise component. Meanwhile, in a specific transmission band, when a transmission band adjacent to only either the long wavelength side or the short wavelength side exists, a mean value of the intensity of light generated in a band (hereinafter, referred to as a "measurement band") from one end on the adjacent transmission band side of the specific transmission band to the adjacent transmission band and the intensity of light generated in the same bandwidth as the measurement band on an opposite side of the adjacent transmission band from another end of the specific transmission band is acquired as a noise component. The light-receiving unit 30 acquires a ratio of the signal component and the noise component as SNR.

The transmission line 40 is described. The transmission line 40 propagates while amplifying light. The transmission line 40 includes, for example, an optical fiber and an optical amplifier. As illustrated in FIG. 1, the transmission line 40 is connected to the switching unit 20 and the light-receiving unit 30. The transmission line 40 propagates the dummy light being output from the switching unit 20 to the light-receiving unit 30.

Next, the operation of the optical communication system 1 is described by using FIG. 2. Note that, when the operation is started, it is assumed that the switching unit 20 is connected to the first transmission line 40a.

The dummy light source 10 outputs dummy light to the switching unit 20 (S101). The switching unit 20 outputs the dummy light from the dummy light source 10 to the first transmission line 40a (S102). In S102, the light-receiving unit 30 acquires signal quality of the dummy light being input from the first transmission line 40a.

The switching unit 20 switches an output destination of the dummy light to the second transmission line 40b (S103). For example, the switching unit 20 performs the operation of S103 after a predetermined time from starting the output of the dummy light by the dummy light source 10.

The switching unit 20 outputs the dummy light from the dummy light source 10 to the second transmission line 40b (S104). In S104, the light-receiving unit 30 acquires signal quality of the dummy light being input from the second transmission line 40b.

The operation of the optical communication system 1 has been described above. Further, the signal quality of the dummy light acquired by the optical communication system 1 is used at the time of adjusting intensity of an optical signal from an unillustrated optical transponder attached to the transmission line 40.

As described above, in the optical communication system 1, the dummy light source 10 outputs the dummy light. Further, the switching unit 20 outputs the dummy light to the first transmission line 40a. At this time, the light-receiving unit 30 acquires the signal quality (first signal quality) according to the dummy light being received via the first transmission line 40a. Further, the switching unit 20 switches the output destination of the dummy light from the first transmission line 40a to the second transmission line 40b. At this time, the light-receiving unit 30 acquires the signal quality (second signal quality) according to the dummy light being received via the second transmission line 40b.

From the above, the optical communication system 1 is able to measure the signal quality of each of the optical signals to be transmitted/received via the plurality of transmission lines 40. Further, in the optical communication system 1, the plurality of transmission lines 40 are measured by using a configuration in which the switching unit 20 switches the transmission lines 40 that output the dummy light. Therefore, the optical communication system 1 can reduce the required cost as compared with a case where a configuration that an optical transmitter and an optical receiver are provided for each of the transmission lines 40 is used.

Second Example Embodiment

Figure 3:
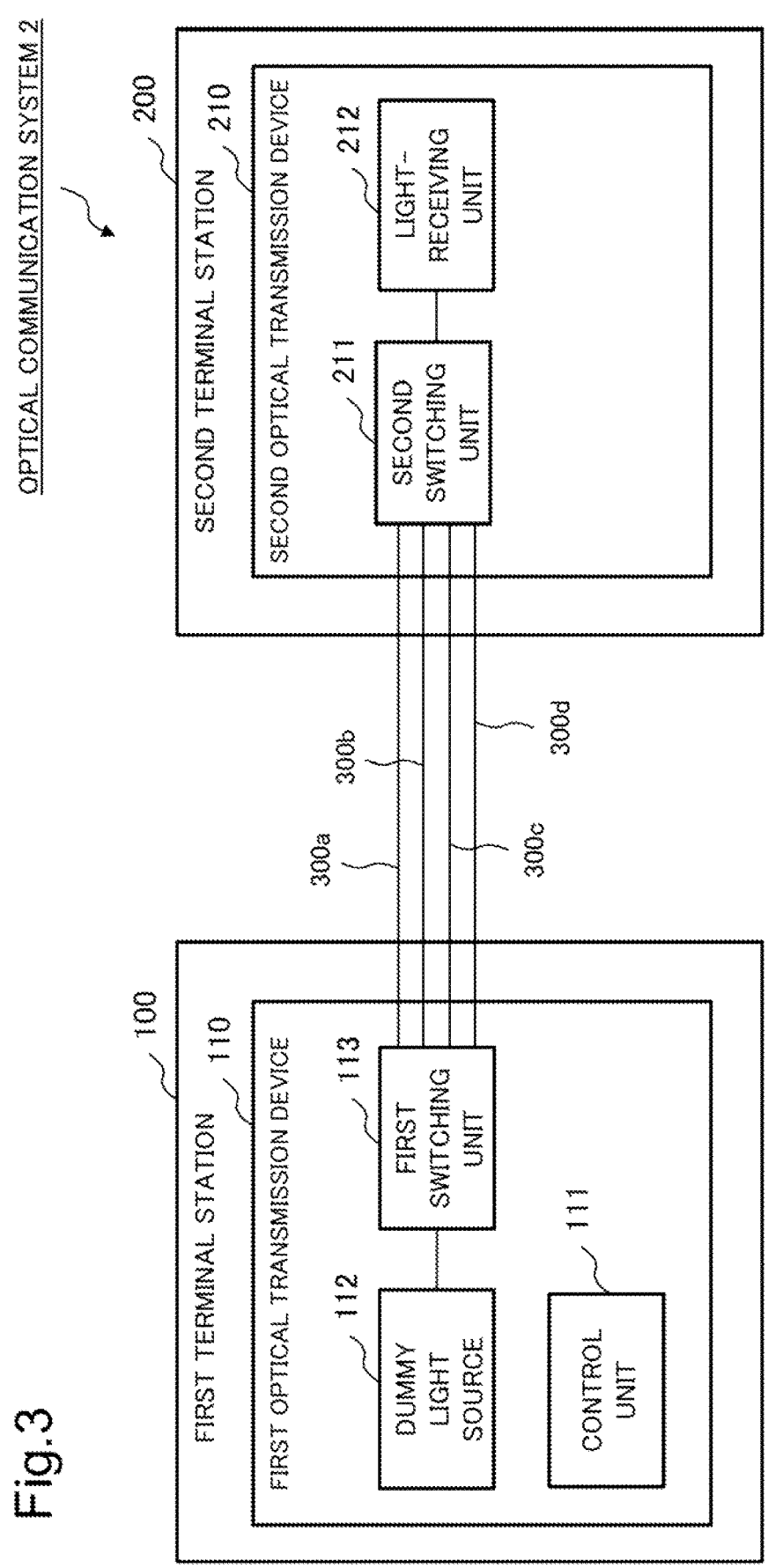
FIG. 3 is a block diagram illustrating a configuration example of an optical communication system according to a second example embodiment of the present invention.
Figure 4:
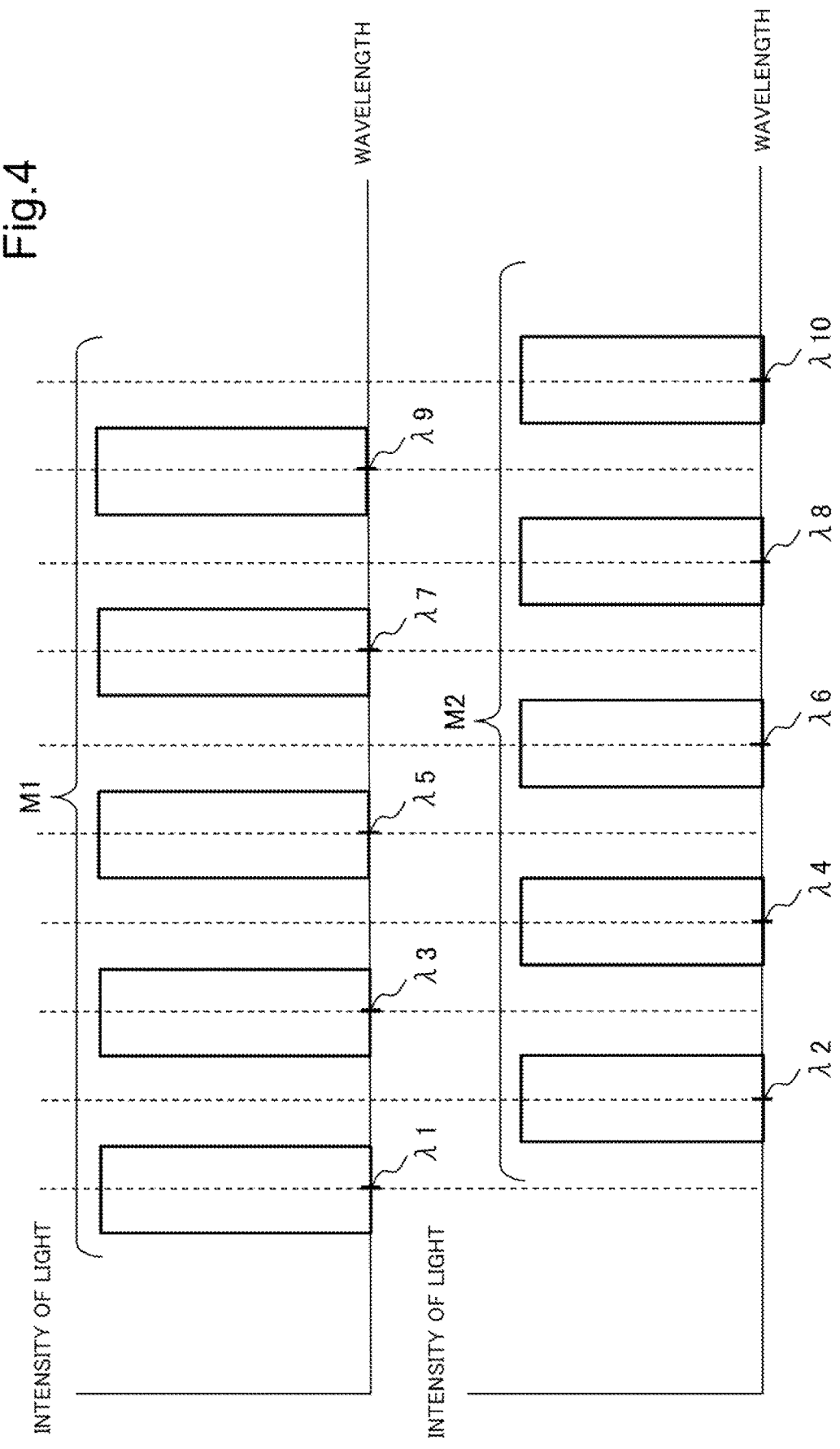
FIG. 4 is a diagram for illustrating one example of the optical communication system according to the second example embodiment of the present invention.
Figure 5:
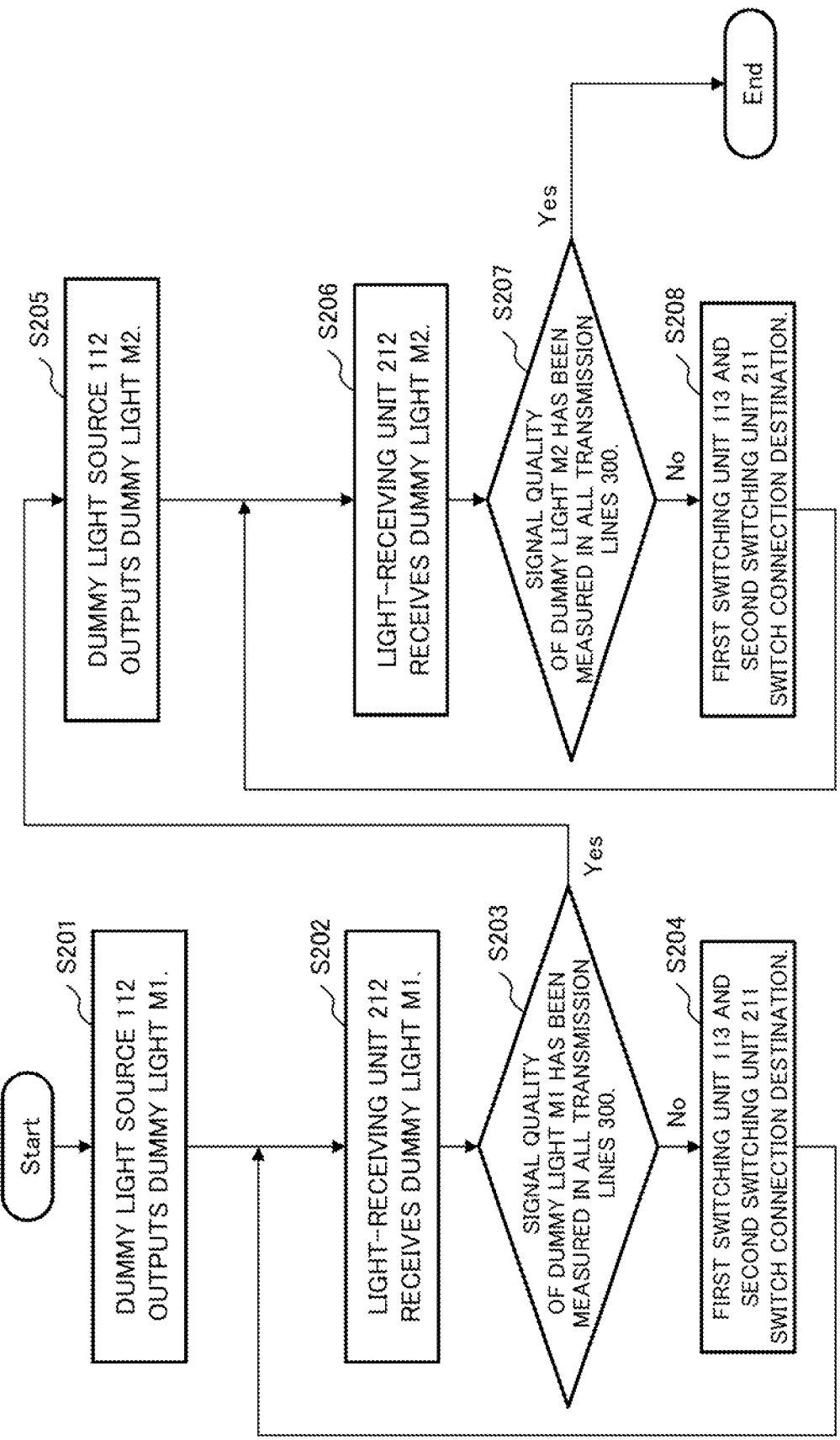
FIG. 5 is a flowchart illustrating an operation example of the optical communication system according to the second example embodiment of the present invention.
Figure 6:
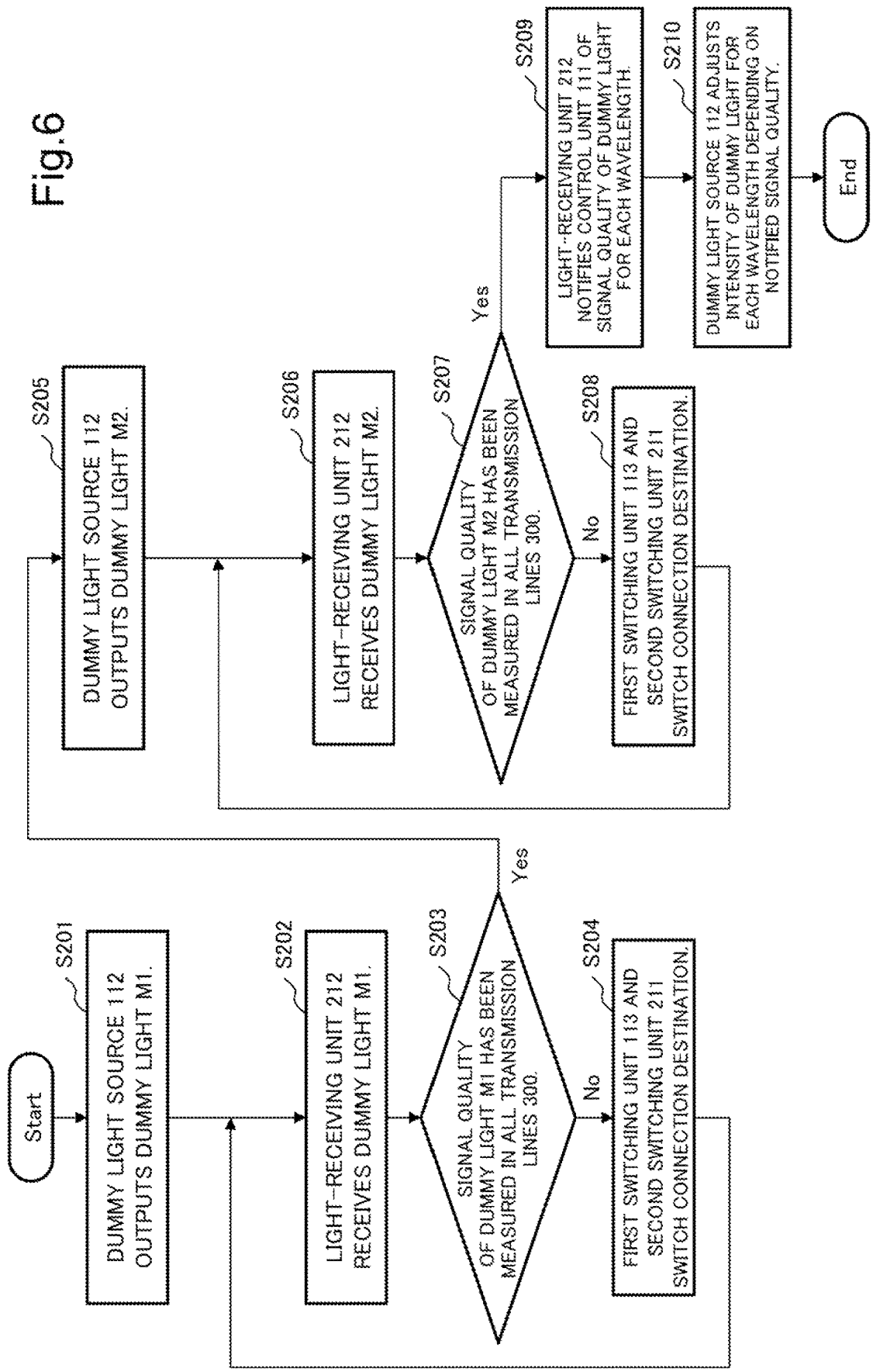
FIG. 6 is a flowchart illustrating an operation example of the optical communication system according to the second example embodiment of the present invention.

An optical communication system 2 according to a second example embodiment of the present invention is described based on FIGS. 3, 4, 5, and 6. FIG. 3 is a block diagram illustrating a configuration example of the optical communication system 2. FIG. 4 is a schematic diagram illustrating one example of an optical spectrum shape of dummy light M1, M2 to be output from a dummy light source 112 to be described later. Further, FIGS. 5 and 6 are flowcharts each illustrating an operation example of the optical communication system 2.

As illustrated in FIG. 3, the optical communication system 2 includes a first terminal station 100 and a second terminal station 200. Further, the optical communication system 2 includes transmission lines 300a, 300b, 300c, and 300d that connect the first terminal station 100 and the second terminal station 200. In the following description, when it is not necessary to distinguish each of the transmission lines 300a to 300d, each of the transmission lines 300a to 300d is referred to as a transmission line 300.

The first terminal station 100 is described. The first terminal station 100 is, for example, a landing station provided on land. The first terminal station 100 includes a first optical transmission device 110.

The first optical transmission device 110 includes a control unit 111, the dummy light source 112, and a first switching unit 113.

The control unit 111 controls the dummy light source 112 and the first switching unit 113. The control unit 111 is described in detail in the following description. A function of the control unit 111 may be achieved by hardware. Alternatively, the control unit 111 may include a central processing unit (CPU) and a storage device, and a function of the optical communication system 2 may be achieved by the CPU executing a program stored in the storage device.

The dummy light source 112 outputs the dummy light M1 or the dummy light M2 illustrated in FIG. 4 toward the first switching unit 113. Further, the dummy light source 112 has at least a similar function to the dummy light source 10 included in the optical communication system 1 according to the first example embodiment.

The dummy light source 112 outputs either the dummy light M1 or the dummy light M2 illustrated in FIG. 4. In the following description, when it is not necessary to distinguish the dummy light M1 from the dummy light M2, each of the dummy light M1 and the dummy light M2 is referred to as a dummy light.

As illustrated in FIG. 4, the dummy light M1 includes light having each of wavelengths $\lambda 1$, $\lambda 3$, $\lambda 5$, $\lambda 7$, and $\lambda 9$. Meanwhile, as illustrated in FIG. 4, the dummy light M2 includes light having each of wavelengths $\lambda 2$, $\lambda 4$, $\lambda 6$, $\lambda 8$, and $\lambda 10$. Intervals between the wavelengths of each light included in the dummy light are set to be equal. For example, an interval between $\lambda 1$ and $\lambda 2$ is equal to an interval between $\lambda 4$ and $\lambda 5$.

The dummy light source 112 outputs either the dummy light M1 or the dummy light M2 in response to control by the control unit 111. For example, when the dummy light source 112 includes an ASE light source and a WSS, the control unit 111 controls the WSS to block light having any bandwidth of which the center wavelength is wavelengths $\lambda 2$, and $\lambda 10$. Thus, the dummy light source 112 outputs the dummy light M1 including the light having wavelengths $\lambda 1$, $\lambda 3$, $\lambda 5$, $\lambda 7$, and $\lambda 9$ among the ASE light to be output from the ASE light source. Meanwhile, when the control unit 111 controls the WSS to block light having any bandwidth of which the center wavelength is wavelengths $\lambda 1$, $\lambda 3$, $\lambda 5$, $\lambda 7$, and $\lambda 9$, the dummy light source 112 outputs the dummy light M2. In this way, by blocking a part of the dummy light, the intensity of light generated outside the band of the dummy light during transmission can be detected for each wavelength on the receiving side. Thus, a light receiving unit 212 can determine a noise component for each wavelength. For example, when the light-receiving unit 212 receives the dummy light M1, the light-receiving unit 212 determines a mean value of the light intensities at the wavelengths λ2 and λ4 as a noise component at the wavelength λ3.

Further, the dummy light source 112 is controlled by the control unit 111 in such a way as to output the dummy light of which light intensity of light at each wavelength is equal to one another. For example, the control unit 111 adjusts the amount of attenuation for each wavelength in the WSS included in the dummy light source 112, and thereby the intensity of light at each wavelength included in the dummy light becomes equal. The control unit 111 has an optical spectrum analyzing function that can measure the intensity of light for each wavelength. Thus, the control unit 111 may monitor the intensity of light for each wavelength included in the dummy light and further adjust the amount of attenuation for each wavelength in the WSS depending on a difference in the intensity of light for each wavelength. In this case, the intensity of light for each wavelength included in the dummy light can be more equalized. Note that the optical spectrum analyzing function is achieved when the light swept for each wavelength by a wavelength tunable filter is received by a photoreceptor.

It is assumed that the first switching unit 113 has at least a similar function to the switching unit 20 included in the optical communication system 1 described according to the first example embodiment. Specifically, the first switching unit 113 can output an input optical signal to any line among four lines. The first switching unit 113 is connected to the dummy light source 112. Further, the first switching unit 113 is connected to any one of the transmission lines 300a to 300d. Further, the first switching unit 113 can be connected to any one of the transmission lines 300a to 300d by switching the connection destination. The first switching unit 113 outputs the dummy light to be input from the dummy light source 112 toward the connected transmission line 300.

The second terminal station 200 is described. The second terminal station 200 is, for example, a landing station provided on land. The second terminal station 200 includes a second optical transmission device 210.

The second optical transmission device 210 includes a second switching unit 211 and the light-receiving unit 212.

The second switching unit 211 is, for example, an optical switch. The second switching unit 211 is connected to the light-receiving unit 212. Further, the second switching unit 211 is connected to any one of the transmission lines 300a to 300d. Further, the second switching unit 211 can be connected to any one of the transmission lines 300a to 300d by switching a connection destination. The second switching unit 211 outputs the dummy light from the connected transmission line 300 toward the light-receiving unit 212. Note that the second switching unit 211 may be an optical coupler. In this case, the second switching unit 211 is connected to all of the transmission lines 300a to 300d.

The control unit 111 controls the first switching unit 113 and the second switching unit 211, thereby the first switching unit 113 and the second switching unit 211 sequentially switch the transmission lines 300 to be connected while connecting to the same transmission line 300 among the transmission lines 300a to 300d. In this case, it is assumed that the control unit 111 and the second switching unit 211 are connected by an unillustrated line. When the second switching unit 211 is an optical coupler, the control unit 111 switches only the connection destination of the first switching unit 113 without controlling the second switching unit 211.

The light-receiving unit 212 has at least a similar function to the light-receiving unit 30 included in the optical communication system 1. The light-receiving unit 212 receives the dummy light transmitted from the dummy light source 112 via the first switching unit 113, any one of the transmission lines 300a to 300d, and the second switching unit 211. The light-receiving unit 212 acquires signal quality of the dummy light received via the transmission line 300. The light-receiving unit 212 determines, for example, a peak level and a noise level for each wavelength in the dummy light as the signal quality. Further, the light-receiving unit 212 determines a tilt characteristic of the dummy light as the signal quality from the peak level for each wavelength, for example. Further, the light-receiving unit 212 determines a deviation of the intensity for each wavelength from the peak levels of a plurality of wavelengths, for example.

The light-receiving unit 212 may also determine a transmission characteristic of the transmission line 300 at wavelengths λ1 to λ10 from the signal quality of the dummy light M1 and the dummy light M2 received via the transmission line 300. For example, the transmission characteristic refers to an amount of gain or attenuation for each wavelength in the transmission line 300. For example, the light-receiving unit 212 determines the amount of attenuation for each wavelength in the transmission line 300 by comparing an optical spectrum of the dummy light at the time of output by the dummy light source 112 with the signal quality of the dummy light.

Next, an operation of the optical communication system 2 is described by using FIGS. 5 and 6. It is assumed that, at the start of the operation, the control unit 111 instructs the dummy light source 112 to output the dummy light M1.

The dummy light source 112 outputs the dummy light M1 (S201). The light-receiving unit 212 receives the dummy light M1 from any one of the transmission lines 300a to 300d (S202). At this time, the light-receiving unit 212 measures signal quality of the received dummy light M1.

When the control unit 111 does not determine that the signal quality of the dummy light M1 has been measured in all of the transmission lines 300a to 300d (No in S203), the control unit 111 switches the connection destination of the first switching unit 113 and the second switching unit 211 (S204). Specifically, when the signal quality of the dummy light M1 is not measured in at least one transmission line 300 among the transmission lines 300a to 300d, the control unit 111 switches the connection destination of the first switching unit 113 and the second switching unit 211.

When the control unit 111 determines that the signal quality of the dummy light M1 has been measured in all of the transmission lines 300a to 300d (Yes in S203), the dummy light source 112 outputs the dummy light M2 instead of the dummy light M1 in response to the instruction of the control unit 111 (S205). In other words, the dummy light source 112 switches the wavelength of the dummy light to be output.

In S203, the control unit 111 determines that the signal quality of the dummy light has been measured in all of the transmission lines 300a to 300d, when, for example, the first switching unit 113 and the second switching unit 211 are connected to all of the transmission lines 300a to 300d.

By the processing in S205, the light-receiving unit 212 receives the dummy light M2 from any one of the transmission lines 300a to 300d (S206). At this time, the light-receiving unit 212 measures signal quality of the received dummy light M2.

When the control unit 111 does not determine that the signal quality of the dummy light M2 has been measured in all of the transmission lines 300a to 300d (No in S207), the control unit 111 switches the connection destination of the first switching unit 113 and the second switching unit 211 (S208). Specifically, when the signal quality of the dummy light M2 is not measured in at least one transmission line 300 among the transmission lines 300a to 300d, the control unit 111 switches the connection destination of the first switching unit 113 and the second switching unit 211.

When the control unit 111 determines that the signal quality of the dummy light M2 has been measured in all of the transmission lines 300a to 300d (Yes in S207), the optical communication system 2 terminates the operation.

In S207, when the control unit 111 determines that the signal quality of the dummy light M2 has been measured in all of the transmission lines 300a to 300d (Yes in S207), the optical communication system 2 does not terminate the operation and may perform next processing. Specifically, as illustrated in FIG. 6, the light-receiving unit 212 notifies the control unit 111 of the signal quality of the dummy light for each wavelength (S209).

The dummy light source 112 adjusts the intensity of the dummy light for each wavelength depending on the notified signal quality (S210). Specifically, the control unit 111 controls the dummy light source 112 based on the notified signal quality. For example, when the signal quality of the wavelength λ4 in the dummy light received via the transmission line 300a is less than a threshold value, the dummy light source 112 increases the intensity of light of λ4 among the dummy light M2 to be output to the transmission line 300a.

At this time, the control unit 111 may store a spectral shape of the dummy light after the intensity has been adjusted in association with each of the plurality of transmission lines 300. Thus, when an optical transponder is provided in each of the plurality of transmission lines 300, the intensity of an optical signal to be output from the optical transponder can be adjusted based on the spectral shape of the stored dummy light. Accordingly, the optical signal to be output from the optical transponder can be received with appropriate signal quality. The operation of the optical communication system 2 has been described above.

Note that, in the above description, it is mentioned that the control unit 111 is arranged in the first optical transmission device 110, however the control unit 111 may be arranged in the second optical transmission device 210. In this case, the control unit 111 arranged in the second optical transmission device 210 is connected to the dummy light source 112 and the first switching unit 113 by an unillustrated line.

Thus, in the optical communication system 2, the first switching unit 113 switches the output destination of the dummy light M1 from the first transmission line (e.g., the transmission line 300a) to the second transmission line (e.g., the transmission line 300b), and then the dummy light source 112 switches from the dummy light M1 to M2. In other words, the dummy light source 112 switches the output destination of the dummy light M1 from the first transmission line (e.g., transmission line 300a) to the second transmission line (e.g., transmission line 300b), and then switches the wavelength of the dummy light.

In general, the time required when switching a transmission line using an optical switch and the like is shorter than the time required for switching a wavelength of an optical signal to be output. Therefore, by outputting dummy light to the plurality of transmission lines 300, switching the wavelength of the dummy light, and then outputting the dummy light to the plurality of transmission lines 300, the time required for outputting the dummy light of different wavelengths to the plurality of transmission lines can be shortened, compared to a case where the wavelength of the dummy light is switched each time the dummy light is output to a different transmission line.

In the optical communication system 2, the dummy light source 112 adjusts the intensity of the dummy light to be output to the first transmission line (e.g., transmission line 300a), based on the signal quality (first signal quality) of the dummy light received via the first transmission line (e.g., transmission line 300a).

Thereby, the optical communication system 2 can output the dummy light with the intensity depending on the signal quality to each of the transmission lines 300. As a result, an optical signal with appropriate signal quality can be input to the light-receiving unit 212.

Third Example Embodiment

Figure 7:
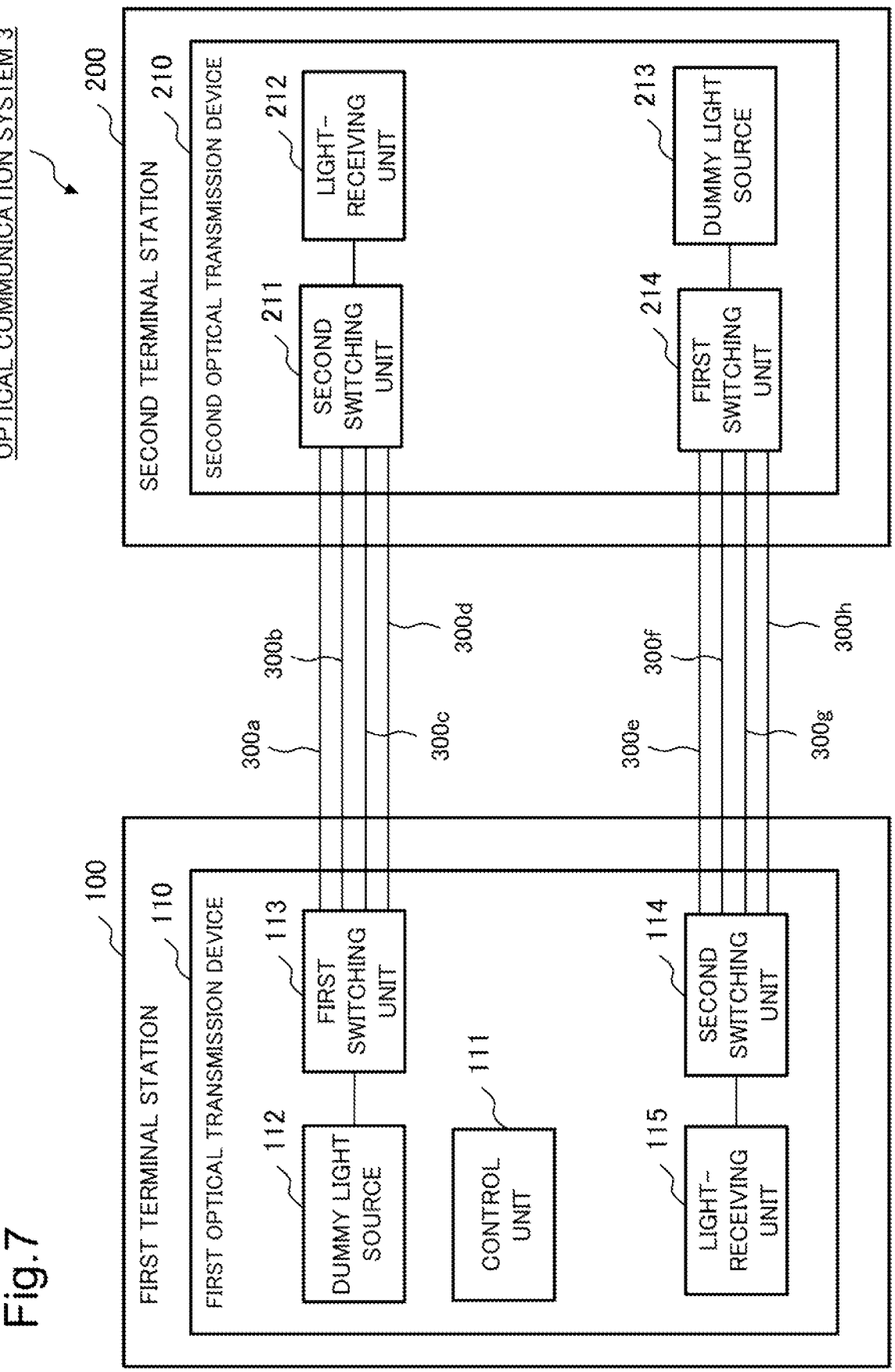
FIG. 7 is a block diagram illustrating a configuration example of an optical communication system according to a third example embodiment of the present invention.
Figure 8:
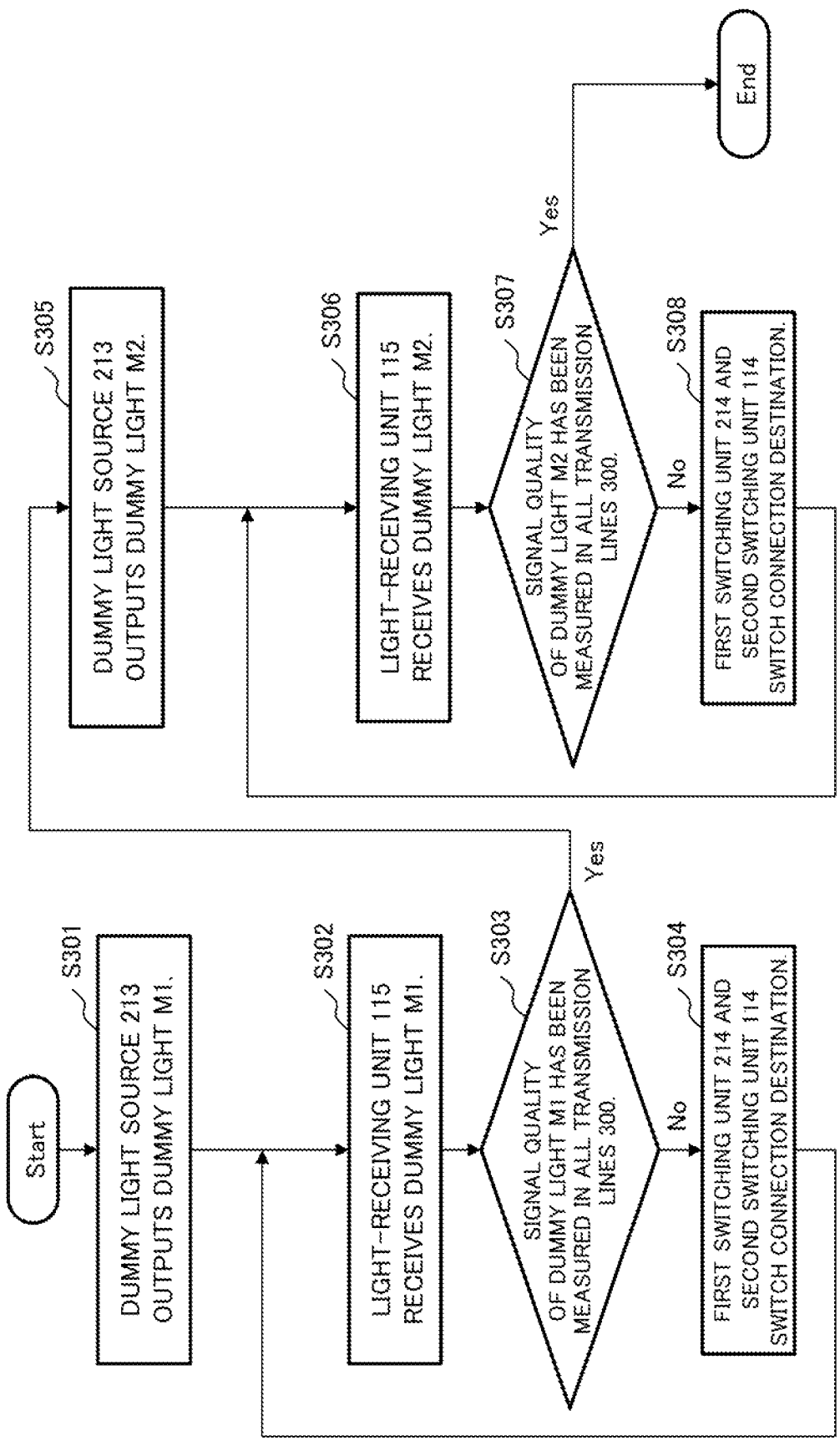
FIG. 8 is a flowchart illustrating an operation example of the optical communication system according to the third example embodiment of the present invention.
Figure 9:
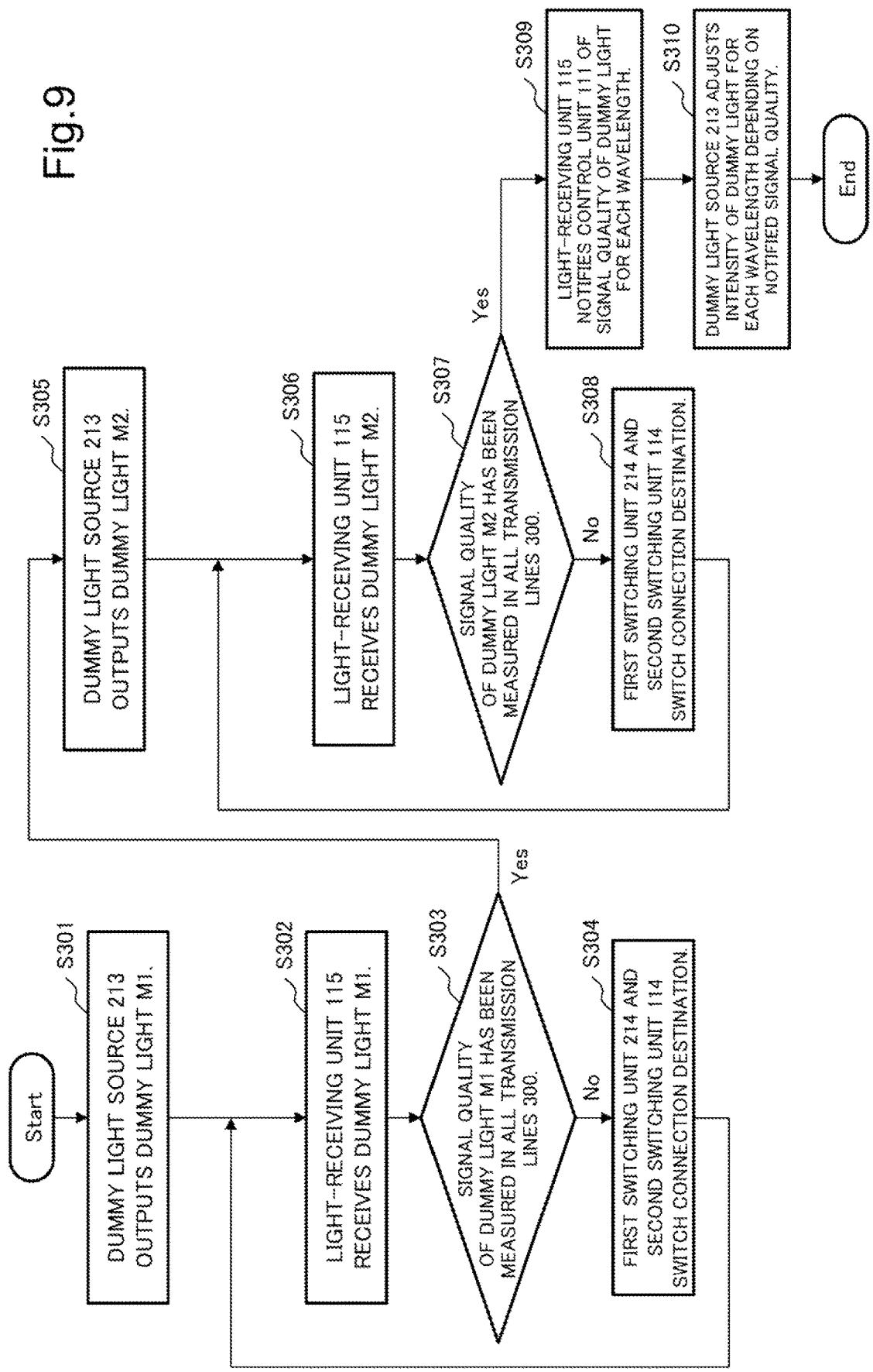
FIG. 9 is a flowchart illustrating an operation example of the optical communication system according to the third example embodiment of the present invention.

An optical communication system 3 according to a third example embodiment of the present invention is described based on FIGS. 7, 8, and 9. FIG. 7 is a block diagram illustrating a configuration example of the optical communication system 3. FIGS. 8 and 9 are flowcharts each illustrating an operation example of the optical communication system 3.

The optical communication system 3 includes at least the configuration included in the optical communication system 2 described according to the second example embodiment.

As illustrated in FIG. 7, a first optical transmission device 110 in the optical communication system 3 includes a second switching unit 114 and a light-receiving unit 115 in addition to the configuration included in the first optical transmission device 110 in the optical communication system 2. A second optical transmission device 210 in the optical communication system 3 further includes a dummy light source 213 and a first switching unit 214 in addition to the configuration included in the second optical transmission device 210 in the optical communication system 2. The optical communication system 3 further includes transmission lines 300e to 300h in addition to the configuration included in the optical communication system 2.

The second switching unit 114 has a similar configuration and a function to the second switching unit 211 in the optical communication system 2. The light-receiving unit 115 has a similar configuration and function to the light-receiving unit 212 in the optical communication system 2. The dummy light source 213 has a similar configuration and function to the dummy light source 112 in the optical communication system 2. The first switching unit 214 has a similar configuration and function to the first switching unit 113 in the optical communication system 2. The first switching unit 214 and the dummy light source 213 are connected to a control unit 111 by an unillustrated line.

Next, an operation of the optical communication system 3 is described. Note that an operation of a dummy light source 112, a first switching unit 113, a second switching unit 211, and a light-receiving unit 212 is similar to the operation example illustrated in FIG. 5 or the operation example illustrated in FIG. 6. Hereinafter, an operation of the dummy light source 213, the first switching unit 214, the second switching unit 114, and the light-receiving unit 115 is described in detail by using FIGS. 8 and 9.

In the optical communication system 3, the control unit 111 controls the dummy light sources 112 and 213, the first switching units 113 and 214, the second switching units 211 and 114, and the light-receiving units 212 and 115.

It is assumed that, at the start of the operation, the control unit 111 instructs the dummy light source 112 and the dummy light source 213 to output dummy light M1.

The dummy light source 213 outputs the dummy light M1 (S301). The light-receiving unit 115 receives the dummy light M1 from any one of the transmission lines 300e to 300h (S302). At this time, the light-receiving unit 115 acquires signal quality of the received dummy light M1.

When the control unit 111 does not determine that the signal quality of the dummy light M1 has been measured in all of the transmission lines 300e to 300h (No in S303), the control unit 111 switches a connection destination of the first switching unit 214 and the second switching unit 114 (S304). Specifically, when the signal quality of the dummy light M1 is not measured in at least one transmission line 300 among the transmission lines 300e to 300h, the control unit 111 switches the connection destination of the first switching unit 214 and the second switching unit 114.

When the control unit 111 determines that the signal quality of the dummy light M1 has been measured in all of the transmission lines 300e to 300h (Yes in S303), the dummy light source 213 outputs dummy light M2 instead of the dummy light M1 (S305). In other words, the dummy light source 213 switches the wavelength of the dummy light to be output.

For example, when the first switching unit 214 and the second switching unit 114 are connected to all of the transmission lines 300e to 300h, the control unit 111 determines that the signal quality of the dummy light has been measured in all of the transmission lines 300e to 300h.

By the processing in S305, the light-receiving unit 115 receives the dummy light M2 from any one of the transmission lines 300e to 300h (S306). At this time, the light-receiving unit 115 acquires signal quality of the received dummy light M2.

When the control unit 111 does not determine that the signal quality of the dummy light M2 has been measured in all of the transmission lines 300e to 300h (No in S307), the control unit 111 switches the connection destination of the first switching unit 214 and the second switching unit 114 (S308). Specifically, when the signal quality of the dummy light M2 is not measured in at least one transmission line 300 among the transmission lines 300e to 300h, the control unit 111 switches the connection destination of the first switching unit 214 and the second switching unit 114.

When the control unit 111 determines that the signal quality of the dummy light M2 has been measured in all of the transmission lines 300e to 300h (Yes in S307), the optical communication system 3 terminates the operation.

When the control unit 111 determines that the signal quality of the dummy light M2 has been measured in all of the transmission lines 300e to 300h (Yes in S307), the optical communication system 3 does not terminate the operation and may perform next processing. Specifically, as illustrated in FIG. 9, the light-receiving unit 115 notifies the control unit 111 of the signal quality of the dummy light for each wavelength (S309). Further, the dummy light source 213 then adjusts the intensity of the dummy light for each wavelength depending on the notified signal quality (S310).

The operation of the optical communication system 3 has been described above.

As described above, the optical communication system 3 includes a first terminal station 100 and a second terminal station 200. Further, the first terminal station 100 includes the dummy light source 112 and the first switching unit 113. Further, the second terminal station 200 includes the light-receiving unit 212, the dummy light source 213 that outputs dummy light, and the first switching unit 214 that outputs the dummy light from the dummy light source 213 toward the first terminal station 100 via any one of the transmission lines 300e to 300h. The first terminal station 100 further includes the light-receiving unit 115 that acquires the signal quality of the dummy light received from the second terminal station 200 via any one of the transmission lines 300e to 300h.

As described above, in the optical communication system 2, the signal quality of the dummy light received via the plurality of transmission lines 300a to 300d from the first terminal station 100 to the second terminal station 200 can be acquired. In the optical communication system 3, the signal quality of the dummy light received via the plurality of transmission lines 300e to 300h from the second terminal station 200 to the first terminal station 100 can be further acquired.

Fourth Example Embodiment

Figure 10:
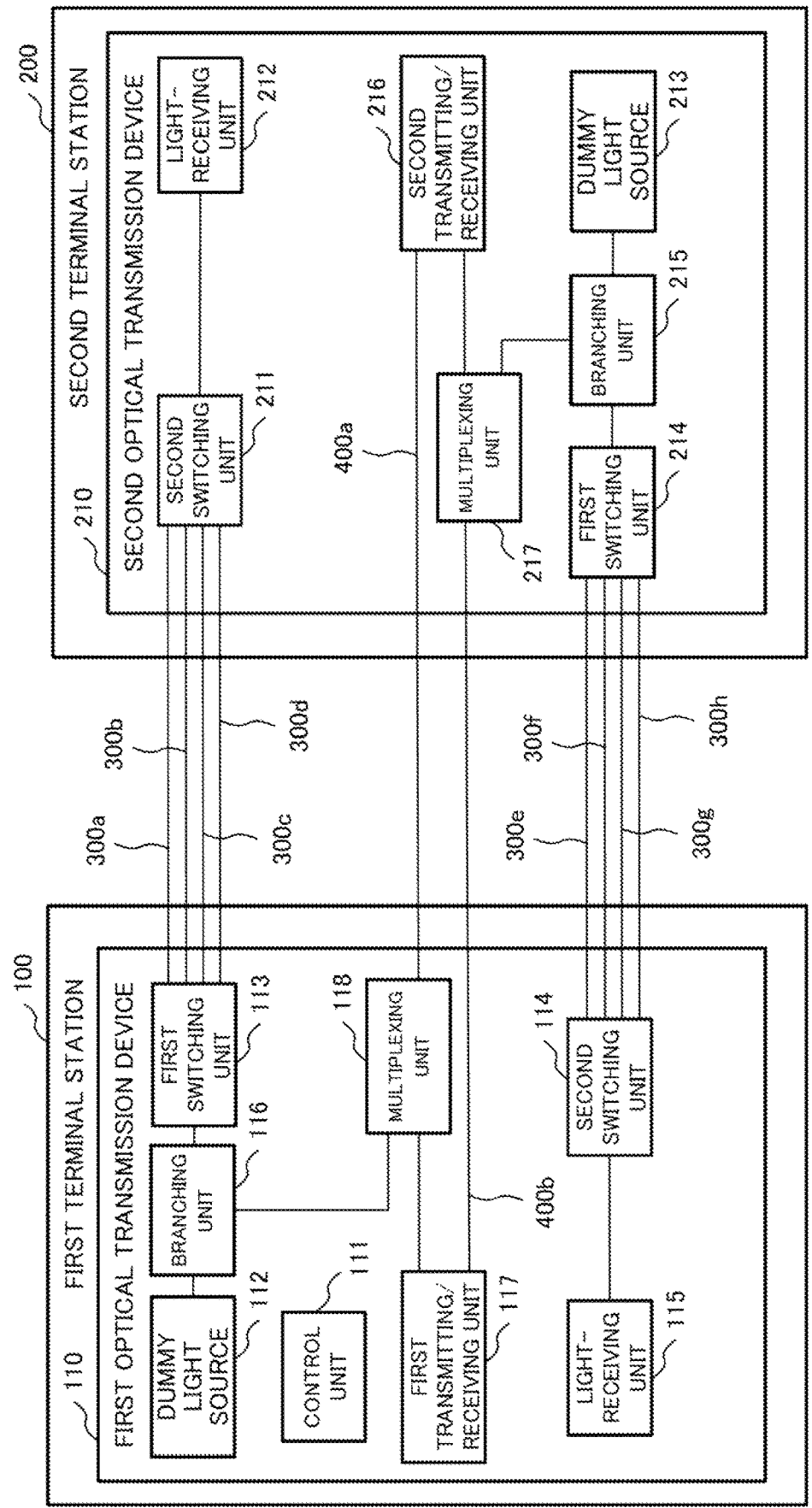
FIG. 10 is a block diagram illustrating a configuration example of an optical communication system according to a fourth example embodiment of the present invention.
Figure 11:
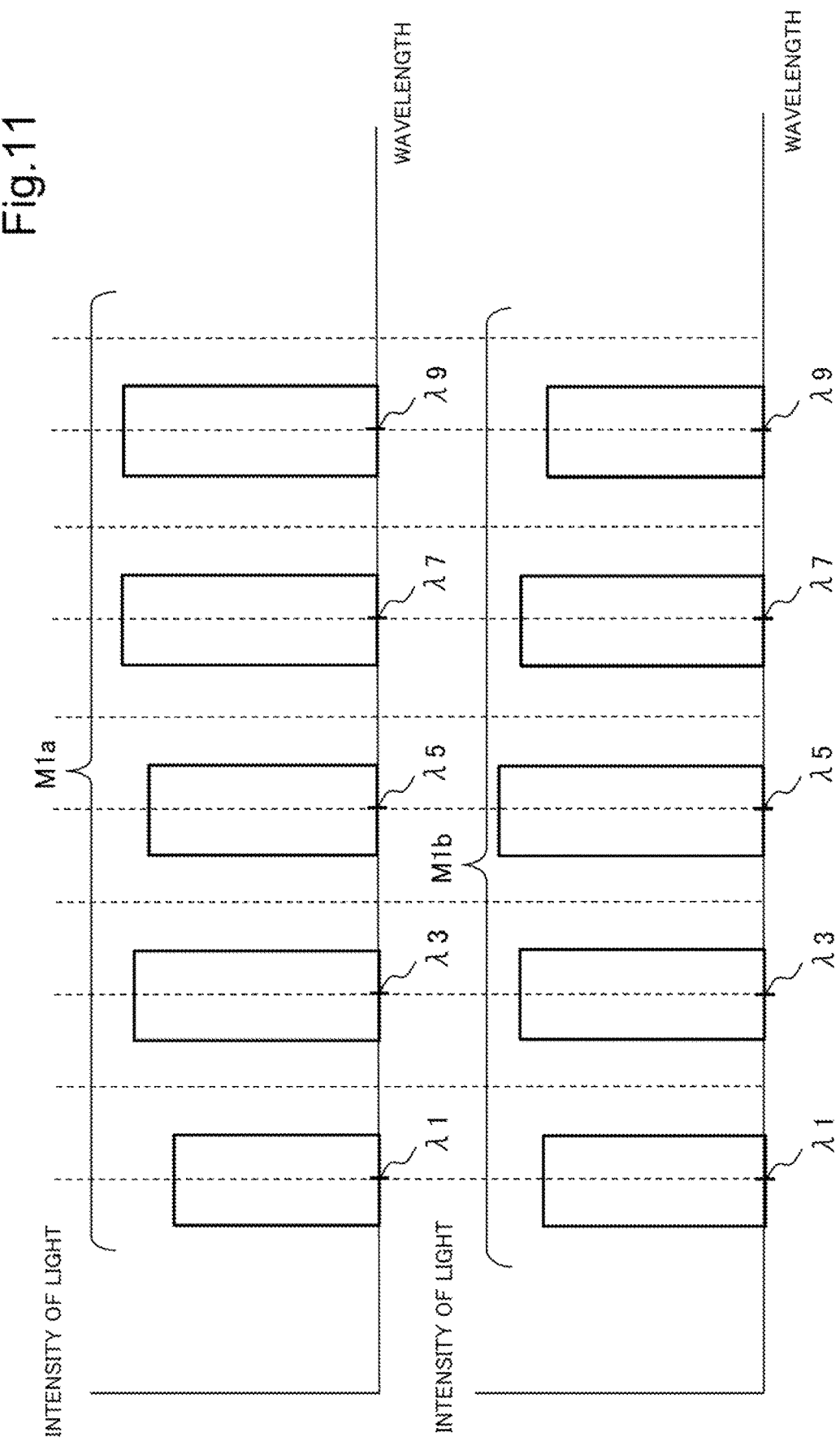
FIG. 11 is a diagram for illustrating one example of the optical communication system according to the fourth example embodiment of the present invention.

An optical communication system 4 according to a fourth example embodiment of the present invention is described based on FIGS. 10, 11, 12, 13, 14, and 15. FIG. 10 is a block diagram illustrating a configuration example of the optical communication system 4. FIG. 11 is one example of an optical spectrum shape of dummy light to be output from each of a dummy light source 112 and a dummy light source 213. FIGS. 12 to 15 are flowcharts each illustrating an operation example of the optical communication system 4.

The optical communication system 4 includes at least the configuration included in the optical communication system 3 described according to the third example embodiment. A first optical transmission device 110 in the optical communication system 4 includes a branching unit 116, a first transmitting/receiving unit 117, and a multiplexing unit 118 in addition to the configuration included in the first optical transmission device 110 in the optical communication system 3. Further, a second optical transmission device 210 in the optical communication system 4 includes a branching unit 215, a second transmitting/receiving unit 216, and a multiplexing unit 217 in addition to the configuration included in the second optical transmission device 210 in the optical communication system 3. Further, the optical communication system 4 includes a control transmission line 400a and a control transmission line 400b.

The branching unit 116 branches dummy light being output from the dummy light source 112 and outputs the dummy light to a first switching unit 113 and the multiplexing unit 118. The branching unit 116 is, for example, an optical coupler.

The first transmitting/receiving unit 117 acquires, from a light-receiving unit 115, signal quality of the dummy light received by the light-receiving unit 115 via any one of a plurality of transmission lines 300e to 300h. Further, the first transmitting/receiving unit 117 outputs an optical signal on which information indicating the signal quality acquired from the light-receiving unit 115 is superimposed to the multiplexing unit 118.

The multiplexing unit 118 multiplexes the dummy light branched from the branching unit 116 with the optical signal from the first transmitting/receiving unit 117, and outputs the multiplexed light to the control transmission line 400a. At this time, the intensity of the optical signal from the first transmitting/receiving unit 117 is lower than the intensity of the dummy light branched from the branching unit 116. Therefore, by multiplexing the dummy light branched from the branching unit 116 with the optical signal from the first transmitting/receiving unit 117, the intensity of the multiplexed light to be output to the control transmission line 400a approaches the intensity of the dummy light to be output toward transmission lines 300a to 300d. Thus, a configuration (e.g., the number of optical amplifiers and the like) in the transmission lines 300a to 300d can also be applied to the control transmission line 400a. The multiplexing unit 118 is, for example, a wavelength division multiplexing (WDM) coupler.

The branching unit 215 branches dummy light being output from the dummy light source 213 and outputs the dummy light to a first switching unit 214 and the multiplexing unit 217. The branching unit 215 is, for example, an optical coupler.

The second transmitting/receiving unit 216 acquires, from a light-receiving unit 212, signal quality of the dummy light received by the light-receiving unit 212 via any one of the plurality of transmission lines 300a to 300d. Further, the second transmitting/receiving unit 216 outputs an optical signal on which information indicating the signal quality acquired from the light-receiving unit 212 is superimposed to the multiplexing unit 217.

The multiplexing unit 217 multiplexes the dummy light branched from the branching unit 215 with the optical signal from the second transmitting/receiving unit 216, and outputs the multiplexed light to the control transmission line 400b. By multiplexing the dummy light branched from the branching unit 215 with the optical signal from the second transmitting/receiving unit 216, the intensity of the multiplexed light to be output to the control transmission line 400b approaches the intensity of the dummy light to be output toward the transmission lines 300e to 300h. Thus, a configuration (e.g., the number of optical amplifiers and the like) in the transmission lines 300e to 300h can also be applied to the control transmission line 400b. The multiplexing unit 217 is, for example, a WDM coupler.

Next, an operation of the optical communication system 4 is described. Note that, at the start of the following operation, the intensity for each wavelength of the dummy light to be output from each of the dummy light source 112 and the dummy light source 213 may be different for each transmission line. For example, by applying processing similar to S210 in the operation of the optical communication system 2, the intensity for each wavelength of the dummy light to be output from each of the dummy light source 112 and the dummy light source 213 may be adjusted for each transmission line depending on the signal quality of the dummy light at the time of reception. For example, as illustrated in FIG. 11, a spectral shape M1a of dummy light M1 to be output from the dummy light source 112 to the transmission line 300a may be different from a spectral shape M1b of the dummy light M1 to be output from the dummy light source 112 to the transmission line 300b.

According to the following operation of the optical communication system 4, the intensity for each wavelength of the dummy light to be output from each of the dummy light source 112 and the dummy light source 213 can be adjusted more precisely.

Figure 12:
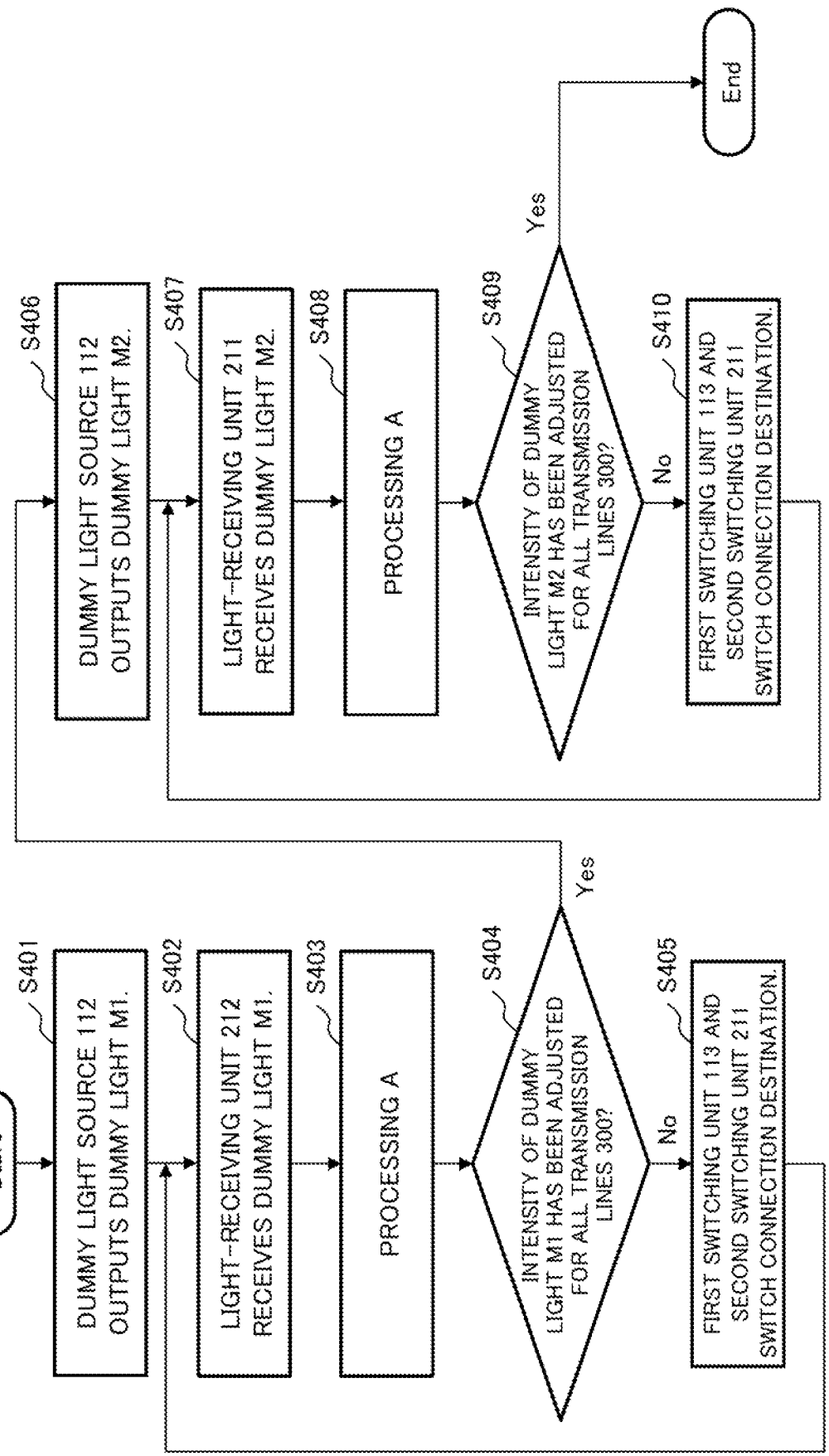
FIG. 12 is a flowchart illustrating an operation example of the optical communication system according to the fourth example embodiment of the present invention.
Figure 13:
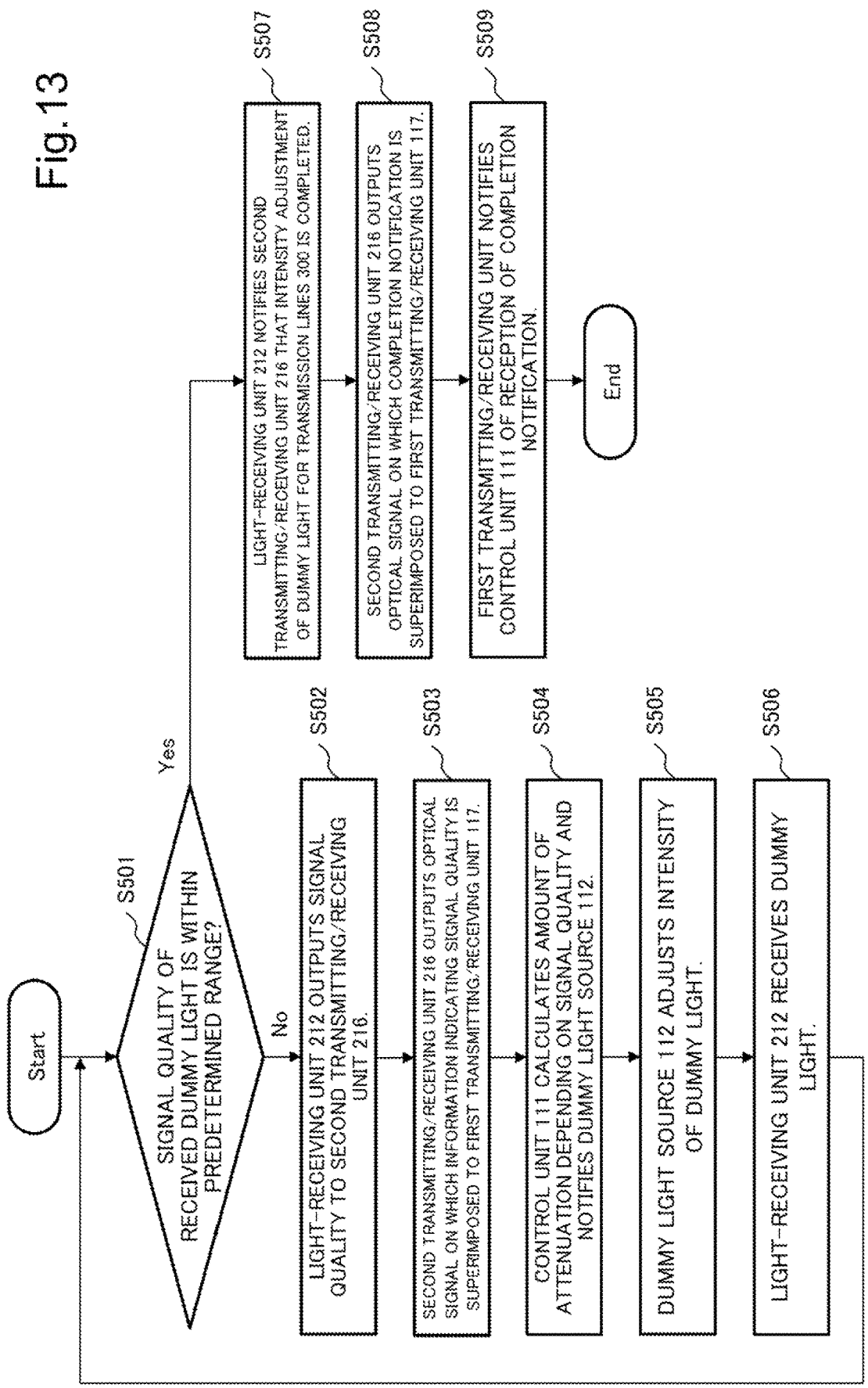
FIG. 13 is a flowchart illustrating an operation example of the optical communication system according to the fourth example embodiment of the present invention.

FIG. 12 is a flowchart illustrating an operation example of the optical communication system 4 at the time of adjusting the dummy light to be output from the dummy light source 112 to the transmission lines 300a to 300d. FIG. 13 is a flowchart illustrating an operation example of the optical communication system 4 in processing A to be described later.

In the flowchart illustrated in FIG. 12, each of operations illustrated in S401, S402, S405 to S407, and S410 is the same as each of the operations illustrated in S201, S202, S204 to S206, and S208 in the operation of the optical communication system 2 illustrated in FIG. 6, and thus the description is omitted. Hereinafter, processing in S403, S404, S408, and S409 in the flowchart illustrated in FIG. 12 is described in detail.

Processing A in each of S403 and S408 executes processing of S501 to S509 illustrated in FIG. 13. In the processing A in S403, the dummy light refers to the dummy light M1. In the processing A in the processing S408, the dummy light refers to the dummy light M2.

The light-receiving unit 212 determines whether signal quality of the received dummy light for each wavelength is within a predetermined range (S501). At this time, when the signal quality of the received dummy light for each wavelength is within the predetermined range (Yes in S501), the light-receiving unit 212 notifies the second transmitting/receiving unit 216 that the intensity adjustment of the dummy light is completed (S507). At this time, the light-receiving unit 212 may further notify the second transmitting/receiving unit 216 of the signal quality of the received dummy light.

Meanwhile, when the light-receiving unit 212 does not determine that the signal quality of the received dummy light is within the predetermined range (No in S501), the light-receiving unit 212 notifies the second transmitting/receiving unit 216 of the signal quality of the received dummy light (S502).

The second transmitting/receiving unit 216 outputs the optical signal on which information indicating the signal quality is superimposed to the first transmitting/receiving unit 117 (S503). At this time, the first transmitting/receiving unit 117 notifies a control unit 111 of the information indicating the signal quality.

The optical signal on which the information indicating the signal quality is superimposed is multiplexed, in the multiplexing unit 217, with the dummy light to be output from the dummy light source 213 and is output. At this time, the optical signal on which the information indicating the signal quality is superimposed is output at a wavelength different from a wavelength of the dummy light to be output from the dummy light source 213.

The control unit 111 calculates an amount of attenuation depending on the notified signal quality and notifies the dummy light source 112 of the calculated amount of attenuation (S504). For example, when the notified signal quality is lower than a threshold value, the control unit 111 calculates a value lower than the amount of attenuation already notified to the dummy light source 112 as a new amount of attenuation.

The dummy light source 112 adjusts the intensity of the dummy light in response to the amount of attenuation notified from the control unit 111 (S505).

The light-receiving unit 212 receives the dummy light of which intensity is adjusted (S506). Then, the light-receiving unit 212 determines whether signal quality of the received dummy light for each wavelength is within the predetermined range (S501).

At this time, when the signal quality of the received dummy light for each wavelength is within the predetermined range (Yes in S501), the light-receiving unit 212 notifies the second transmitting/receiving unit 216 of a completion notification indicating that the intensity adjustment of the dummy light is completed (S507).

The second transmitting/receiving unit 216 outputs an optical signal on which a completion notification is superimposed to the first transmitting/receiving unit 117 (S508).

The first transmitting/receiving unit notifies the control unit 111 of reception of the completion notification (S509). At this time, the control unit 111 determines that the intensity of the dummy light has been adjusted in the transmission line 300 being a connection destination of the first switching unit 113 and a second switching unit 211. At this time, the control unit 111 associates the intensity (optical spectrum shape) for each wavelength of the dummy light being output from the dummy light source 112 with the transmission line 300 being the connection destination of the first switching unit 113 and the second switching unit 211 and stores the intensity of the dummy light for each wavelength in an unillustrated storage unit. S403 and S408 have been described above. The intensity for each wavelength of the dummy light stored in the storage unit is used when the intensity of an optical signal to be output from an optical transponder provided for any one of the transmission lines 300a to 300d is adjusted.

Next, S404 and S409 are described.

In S404, when the control unit 111 determines that the intensity of the dummy light has been adjusted for all of the transmission lines 300 by performing the processing A in S403 described above (Yes in S404), processing in S406 is performed. When the control unit 111 does not determine that the intensity of the dummy light has been adjusted for all of the transmission lines 300 by performing the processing A in S403 described above (No in S404), processing in S405 is performed.

In S409, when the control unit 111 determines that the intensity of the dummy light has been adjusted for all of the transmission lines 300 by performing the processing A in S408 described above (Yes in S409), the operation is terminated. When the control unit 111 does not determine that the intensity of the dummy light has been adjusted for all of the transmission lines by performing the processing A in S408 described above (No in S409), processing in S410 is performed. S404 and S409 have been described above.

The operation example of the optical communication system 4 at the time of adjusting the dummy light to be output from the dummy light source 112 to the transmission lines 300a to 300d has been described above.

Next, the operation example of the optical communication system 4 at the time of adjusting the dummy light to be output from the dummy light source 213 to the transmission lines 300e to 300h is described.

Figure 14:
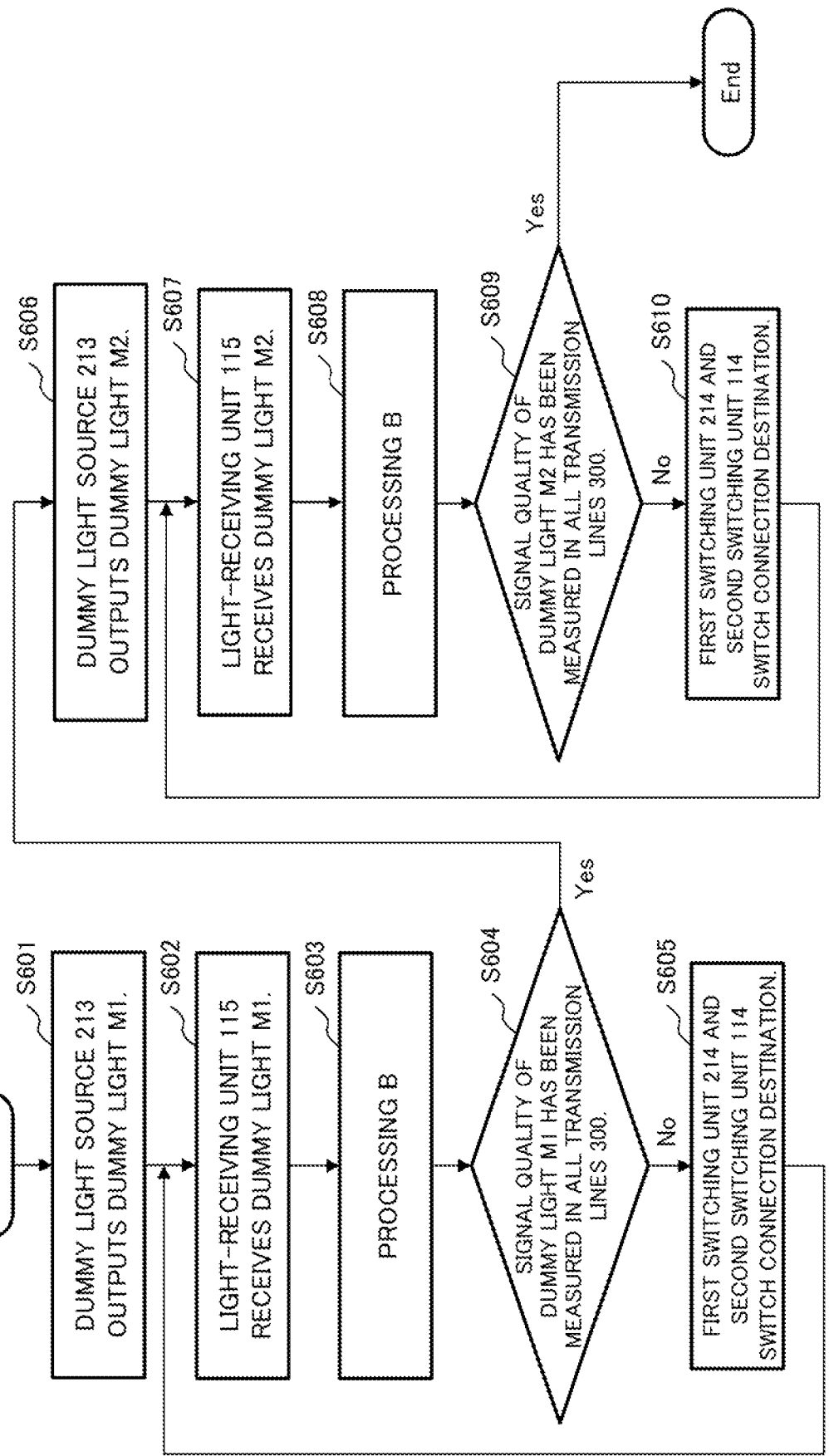
FIG. 14 is a flowchart illustrating an operation example of the optical communication system according to the fourth example embodiment of the present invention.
Figure 15:
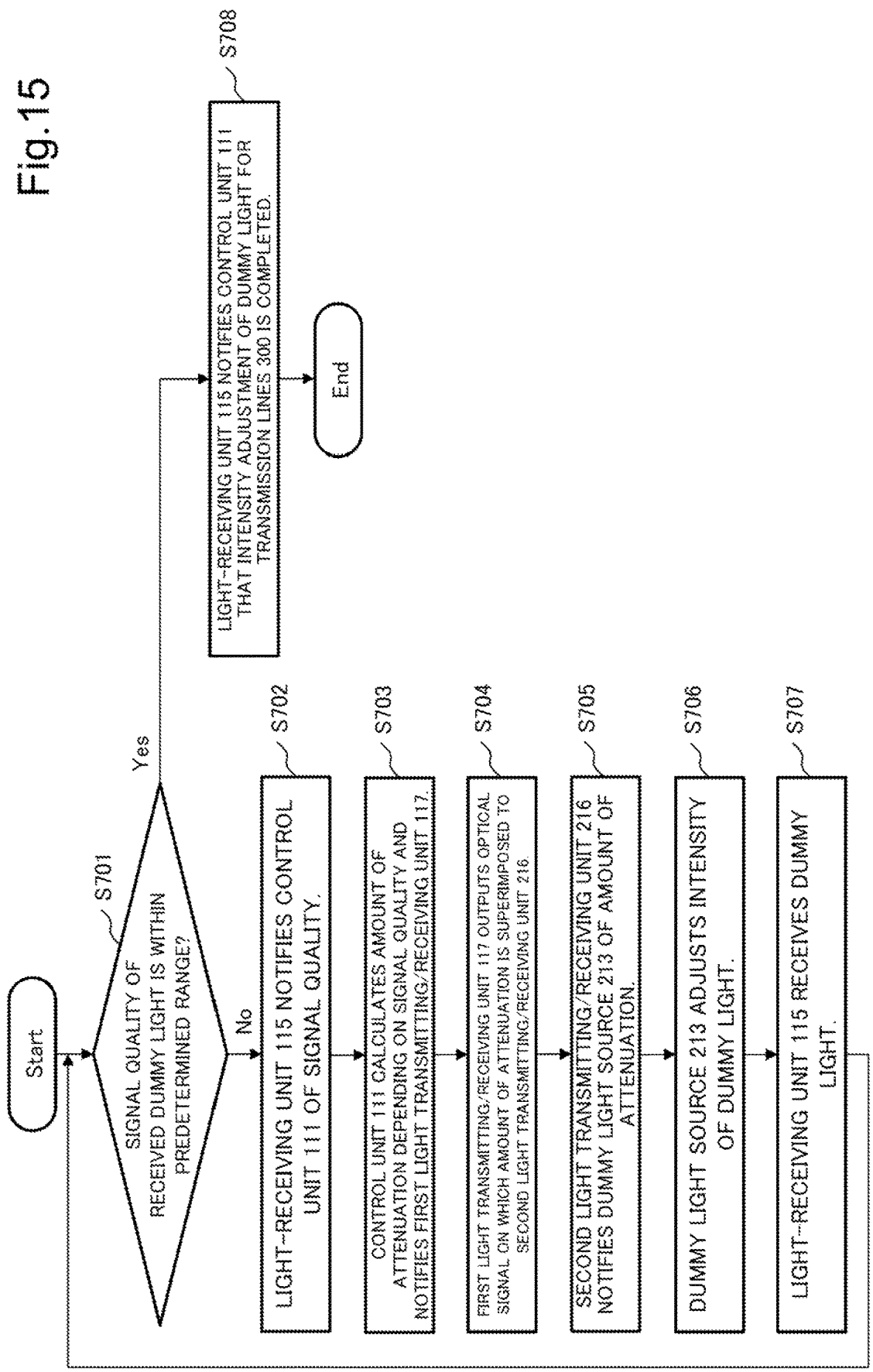
FIG. 15 is a flowchart illustrating an operation example of the optical communication system according to the fourth example embodiment of the present invention.

FIG. 14 is a flowchart illustrating an operation example of the optical communication system 4 at the time of adjusting dummy light to be output from the dummy light source 213 to the transmission lines 300e to 300h. FIG. 15 is a flowchart illustrating an operation example of the optical communication system 4 in processing B to be described later.

In the flowchart illustrated in FIG. 14, each of operations illustrated in S601, S602, S605 to S607, and S610 is the same as each of the operations illustrated in S301, S302, S304 to S306, and S308 in the operation of the optical communication system 3 illustrated in FIG. 8, and thus the description is omitted. Hereinafter, processing in S603, S604, S608, and S609 in the flowchart illustrated in FIG. 14 is described in detail.

Processing B in each of S603 and S608 executes processing of S701 to S708 illustrated in FIG. 15. In the processing B in S603, the dummy light refers to the dummy light M1.

In the processing B in processing S608, the dummy light refers to the dummy light M2.

The light-receiving unit 115 determines whether signal quality of the received dummy light is within a predetermined range (S701). At this time, when the signal quality of the received dummy light is within the predetermined range (Yes in S701), the light-receiving unit 115 notifies the control unit 111 that the intensity adjustment of the dummy light is completed (S708). At this time, the light-receiving unit 212 may further notify the second transmitting/receiving unit 216 of the signal quality of the received dummy light.

Meanwhile, when the light-receiving unit 115 does not determine that the signal quality of the received dummy light is within the predetermined range (No in S701), the light-receiving unit 115 notifies the control unit 111 of the signal quality of the received dummy light (S702).

The control unit 111 calculates an amount of attenuation depending on the signal quality and notifies the first transmitting/receiving unit 117 of the calculated amount of attenuation (S703).

The first transmitting/receiving unit 117 outputs an optical signal on which the notified amount of attenuation is superimposed to the second transmitting/receiving unit 216 (S704).

The optical signal on which information indicating the amount of attenuation is superimposed is multiplexed with the dummy light to be output from the dummy light source 112 and is output. At this time, the optical signal on which the information indicating the signal quality is superimposed is output at a wavelength different from a wavelength of the dummy light to be output from the dummy light source 112.

The second transmitting/receiving unit 216 notifies the dummy light source 213 of the amount of attenuation being superimposed on the optical signal from the first transmitting/receiving unit 117 (S705).

The dummy light source 213 adjusts the intensity of the dummy light in response to the amount of attenuation notified from the second transmitting/receiving unit 216 (S706).

The light-receiving unit 115 receives the dummy light of which the intensity is adjusted (S707). Then, the light-receiving unit 115 determines whether signal quality of the received dummy light is within the predetermined range (S701).

At this time, when the signal quality of the received dummy light is within the predetermined range (Yes in S701), the light-receiving unit 115 notifies the control unit 111 that the intensity adjustment of the dummy light is completed (S707). At this time, the control unit 111 determines that the intensity of the dummy light has been adjusted in the transmission line being a connection destination of the first switching unit 214 and a second switching unit 114. At this time, the control unit 111 associates the intensity (optical spectrum shape) for each wavelength of the dummy light to be output from the dummy light source 213 with the transmission line 300 being the connection destination of the first switching unit 214 and the second switching unit 114 and stores the intensity of the dummy light for each wavelength in an unillustrated storage unit. For example, the control unit 111 acquires the intensity (optical spectrum shape) for each wavelength of the dummy light being output from the dummy light source 213 in response to the amount of attenuation notified to the dummy light source 213 via the first transmitting/receiving unit 117 and the second transmitting/receiving unit 216. The intensity for each wavelength of the dummy light stored in the storage unit is used when the intensity of an optical signal to be output from an unillustrated transponder provided for any one of the transmission lines 300e to 300h is adjusted.

For example, the control unit 111 stores in advance an optical spectrum shape of light to be output from the dummy light source 213 when the amount of attenuation is not set. The control unit 111 acquires the intensity for each wavelength of the dummy light to be output from the dummy light source 213 by subtracting the amount of attenuation for each wavelength notified to the dummy light source 213, from the intensity for each wavelength indicated by the spectral shape. S603 and S608 have been described above.

Next, S604 and S609 are described.

In S604, when the control unit 111 determines that the intensity adjustment for the dummy light by the processing B in S603 described above has been performed for all of the transmission lines 300e to 300h (Yes in S604), processing in S606 is performed. When the control unit 111 does not determine that the intensity adjustment for the dummy light by the processing B in S603 described above has been performed for all of the transmission lines 300e to 300h (No in S604), processing in S605 is performed.

In S609, when the control unit 111 determines that the intensity adjustment for the dummy light by the processing B in S608 described above has been performed for all of the transmission lines 300e to 300h (Yes in S609), the optical communication system 4 terminates the operation. When the control unit 111 does not determine that the intensity adjustment for the dummy light by the processing B in S608 described above has been performed for all of the transmission lines 300e to 300h (No in S609), processing in S610 is performed.

The operation of the optical communication system 4 at the time of adjusting the dummy light to be output from the dummy light source 213 to the transmission lines 300e to 300h has been described above.

As described above, the optical communication system 4 further includes the control transmission line 400b that connects a first terminal station 100 to a second terminal station 200. The second terminal station 200 includes the control transmitting unit (second transmitting/receiving unit 216) that outputs an optical signal including information indicating first signal quality acquired by the light-receiving unit 212 in the second terminal station 200 to the first terminal station 100 via the control transmission line 400b. The first signal quality refers to the signal quality of the dummy light to be output from the dummy light source 112 at the time when the light-receiving unit 212 receives the dummy light. Then, the dummy light source 112 in the first terminal station 100 adjusts the intensity of the dummy light to be output, based on the information indicating the first signal quality included in the optical signal from the control transmitting unit.

With the above-described configuration, the optical communication system 4 can adjust the intensity of the dummy light depending on the signal quality without using a line outside the system.

The optical communication system 4 further includes the branching unit 215 and the multiplexing unit 217. The branching unit 215 branches the dummy light from the dummy light source 213 in the second terminal station 200. The multiplexing unit 217 multiplexes the dummy light from the dummy light source 213, which is branched by the branching unit 215, with the optical signal from the control transmitting unit (second transmitting/receiving unit 216), and outputs the multiplexed light to the first terminal station 100.

As described above, the optical communication system 4 can output, from the same light source (dummy light source 213), the dummy light to be transmitted from the second terminal station 200 to the first terminal station 100 via the transmission lines e to 300h and the dummy light to be multiplexed with the optical signal from the control transmitting unit (second transmitting/receiving unit 216) and to be output. Consequently, the configuration can be simplified compared to a case where a light source that outputs dummy light to any of the transmission lines 300e to 300h and a light source of dummy light that is multiplexed with an optical signal from a control transmitting unit 216A and is output are provided.

Figure 16:
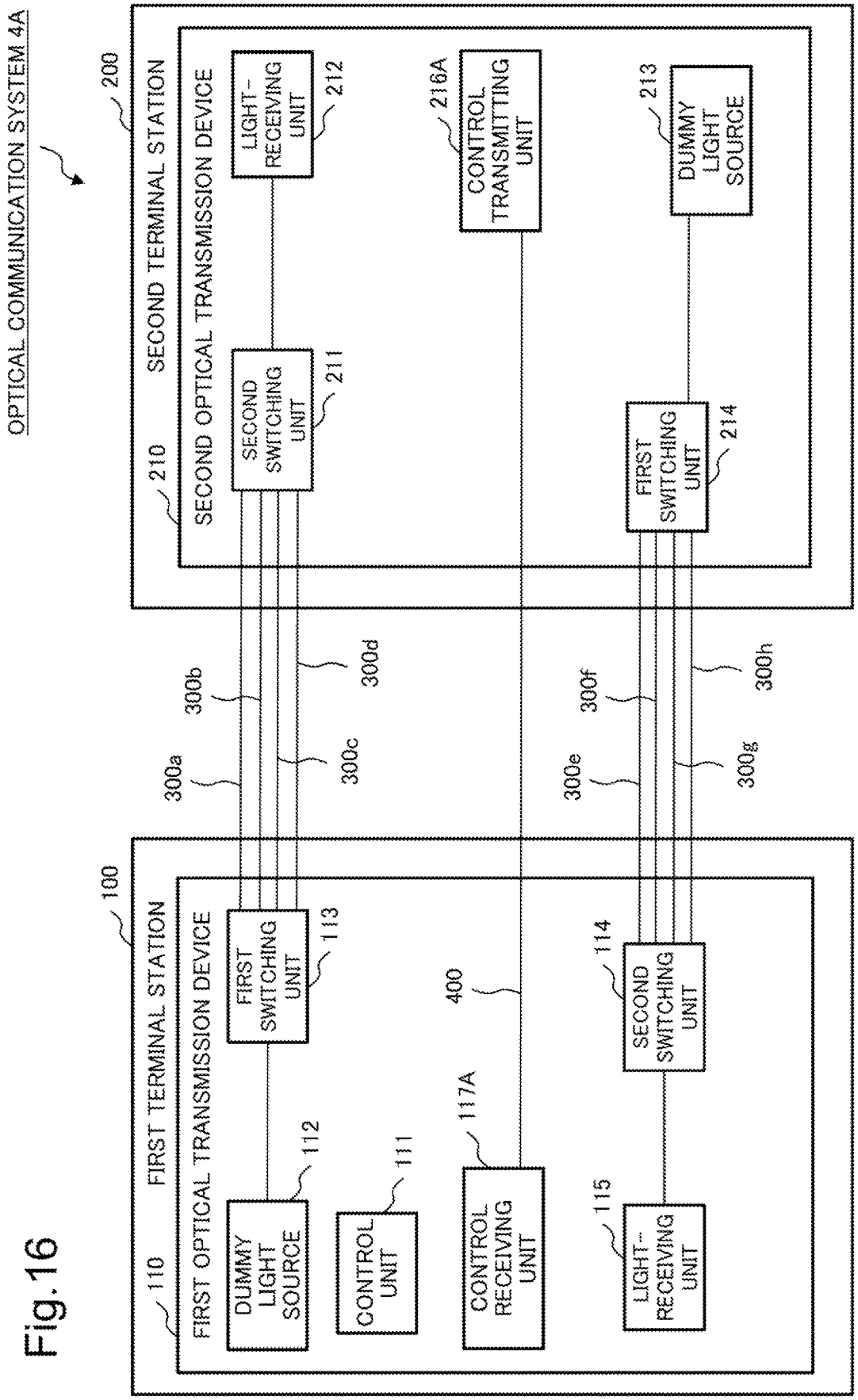
FIG. 16 is a block diagram illustrating a configuration example of a modification example of the optical communication system according to the fourth example embodiment of the present invention.

Next, an optical communication system 4A is described by using FIG. 16. The optical communication system 4A is a first modification example of the optical communication system 4. Specifically, the optical communication system 4A has a configuration that excludes the branching unit 116, the multiplexing unit 118, the branching unit 215, and the multiplexing unit 217 from the optical communication system 4. Further, instead of the first transmitting/receiving unit 117, a control receiving unit 117A is included. Further, instead of the second transmitting/receiving unit 216, a control transmitting unit 216A is included.

The control transmitting unit 216A has a part of the functions of the second transmitting/receiving unit 216. Specifically, the control transmitting unit 216A superimposes the information including the signal quality of the dummy light received by the light-receiving unit 212 on an optical signal and outputs the optical signal to the control receiving unit 117A via a control transmission line 400.

The control receiving unit 117A has a part of the functions of the first transmitting/receiving unit 117. Specifically, the control receiving unit 117A receives the optical signal from the control transmitting unit 216A. The control receiving unit 117A notifies the control unit 111 of the information including the signal quality being superimposed on the optical signal from the control transmitting unit 216A.

In the description of the optical communication system 4, it is mentioned that the intensity of both the dummy light to be output from the dummy light source 112 and the dummy light to be output from the dummy light source 213 are adjusted. Meanwhile, in the optical communication system 4A, the intensity of the dummy light to be output from the dummy light source 112 can be adjusted.

As described above, the optical communication system 4A further includes the control transmission line 400 that connects the first terminal station 100 to the second terminal station 200. The second terminal station 200 includes the control transmitting unit 216A that outputs the optical signal including the information indicating the first signal quality acquired by the light-receiving unit 212 in the second terminal station 200 to the first terminal station 100 via the control transmission line 400. The first signal quality refers to the signal quality of the dummy light being output from the dummy light source 112 at the time when the light-receiving unit 212 receives the dummy light. Then, the dummy light source 112 in the first terminal station 100 adjusts the intensity of the dummy light to be output, based on the information indicating the first signal quality included in the optical signal from the control transmitting unit 216A.

With the above-described configuration, the optical communication system 4A can adjust the intensity of the dummy light depending on the signal quality without using a line outside the system.

Figure 17:
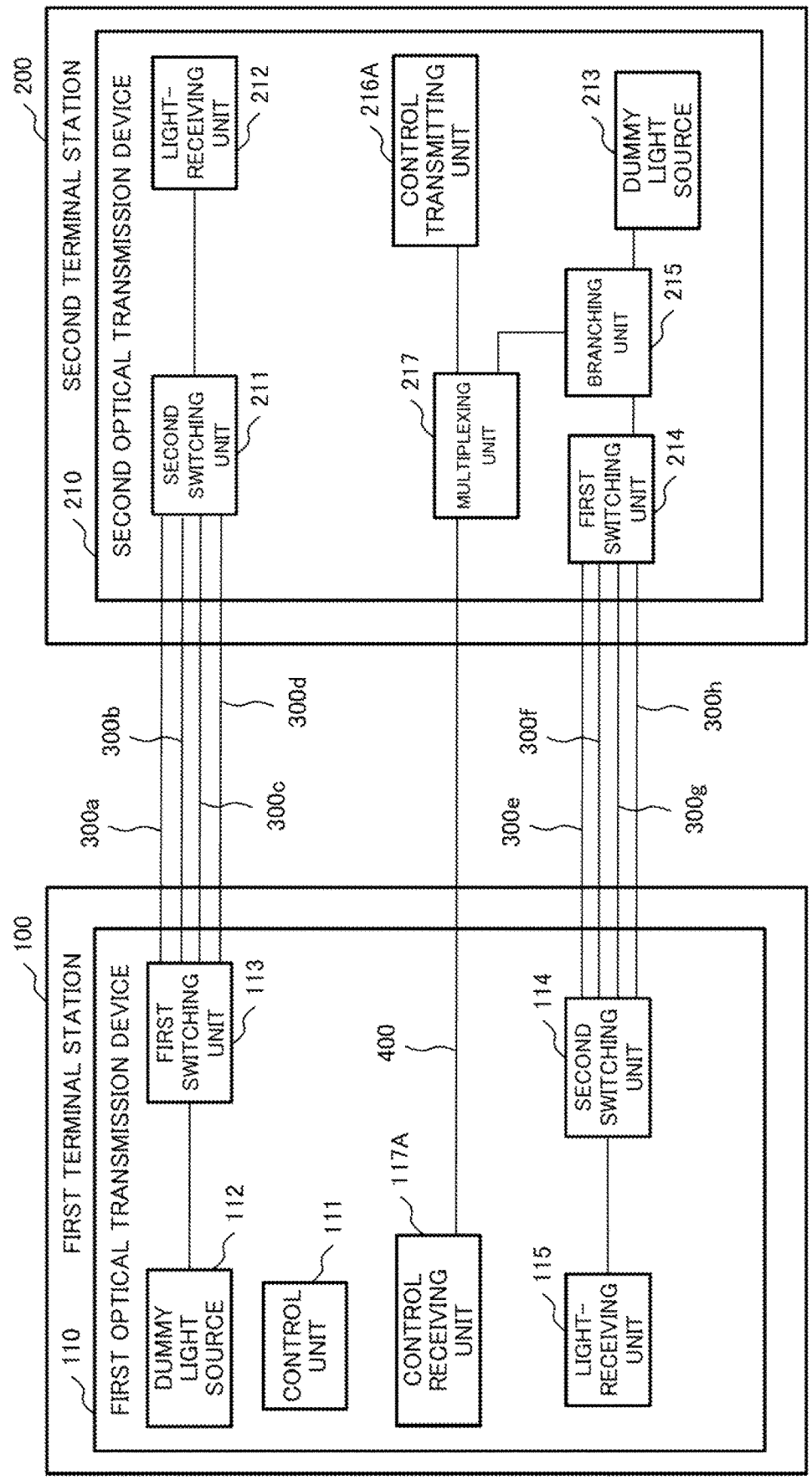
FIG. 17 is a block diagram illustrating a configuration example of a modification example of the optical communication system according to the fourth example embodiment of the present invention.

Next, an optical communication system 4B is described by using FIG. 17. The optical communication system 4A is a second modification example of the optical communication system 4. Specifically, the optical communication system 4B has a form in which the branching unit 215 and the multiplexing unit 217 are added to the optical communication system 4A.

The branching unit 215 branches the dummy light being output from the dummy light source 213 and outputs the dummy light to the first switching unit 214 and the multiplexing unit 217.

The multiplexing unit 217 multiplexes the dummy light from the branching unit 215 with the optical signal from the control transmitting unit 216A and outputs the multiplexed light. By multiplexing the dummy light branched from the branching unit 215 with the optical signal from the control transmitting unit 216A, the intensity of the multiplexed light to be output to the control transmission line 400 approaches the intensity of the dummy light to be output toward the transmission lines 300e to 300f. Thus, a configuration (e.g., the number of optical amplifiers and the like) in the transmission lines 300e to 300f can also be applied to the control transmission line 400. As a result, the control transmission line 400 can be easily designed.

As described above, the optical communication system 4B can output, from the same light source (dummy light source 213), the dummy light to be transmitted from the second terminal station 200 to the first terminal station 100 via the transmission lines 300e to 300h and the dummy light to be multiplexed with the optical signal from the control transmitting unit 216A and to be output. Consequently, the configuration can be simplified compared to a case where a light source that outputs dummy light to any one of the transmission lines 300e to 300h and a light source of dummy light that is multiplexed with an optical signal from a control transmitting unit 216A and is output are provided.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

This application is based upon and claims the benefit of priority from Japanese patent application No. 2019-176939, filed on Sep. 27, 2019, the disclosure of which is incorporated herein in its entirety by reference.

REFERENCE SIGNS LIST 10, 112, 213 Dummy light source
20 Switching unit
30 Light-receiving unit
40, 40a, 40b Transmission line
100 First terminal station
110 First optical transmission device
111 Control unit
113, 214 First switching unit
114, 211 Second switching unit
115, 212 Light-receiving unit
116, 215 Branching unit
117 First transmitting/receiving unit
117A Control receiving unit
118, 217 Multiplexing unit
200 Second terminal station
210 Second optical transmission device
216 Second transmitting/receiving unit
216A Control transmitting unit
300, 300a, 300b, 300c, 300d, 300e, 300f, 300g, 300h Transmission line
400, 400a, 400b Control transmission line
M1, M2 Dummy light

What is claimed is:

1. An optical communication system comprising:
a dummy light source that outputs dummy light;
a switch configured to output the dummy light to a first transmission line;
a light-receiver configured to acquire first signal quality according to the dummy light being received via the first transmission line, wherein
the switch switches an output destination of the dummy light from the first transmission line to a second transmission line, and
the light-receiver acquires second signal quality according to the dummy light being received via the second transmission line;
a first terminal station and a second terminal station, wherein
the first terminal station includes
the dummy light source, and
the switch,
the second terminal station includes
a light-receiver,
a dummy light source that outputs dummy light, and
a switch configured to output the dummy light from the dummy light source included in the second terminal station toward the first terminal station via either a third transmission line or a fourth transmission line, and
the first terminal station further includes a light-receiver configured to acquire signal quality of the dummy light being received from a second terminal station via either the third transmission line or the fourth transmission line; and
a control transmission line that connects the first termination station to the second termination station, wherein
the second terminal station includes a control transmitter configured to output an optical signal including information indicating the first signal quality acquired by the light-receiver in the second terminal station to the first terminal station via the control transmission line, and
the dummy light source included in the first terminal station adjusts intensity of the dummy light to be output by the dummy light source included in the first terminal station, based on information indicating the first signal quality included in the optical signal;
wherein the second terminal station includes
a brancher configured to branch the dummy light from the dummy light source in the second terminal station, and
a multiplexer configured to multiplex the dummy light being branched by the brancher with the optical signal from the control transmitter and outputting the multiplexed light to the first terminal station.

2. The optical communication system according to claim 1, wherein the dummy light source switches a wavelength of the dummy light after the switch switches an output destination of the dummy light from the first transmission line to the second transmission line.

3. The optical communication system according to claim 1, wherein
the dummy light source adjusts intensity of the dummy light to be output to the first transmission line, based on the first signal quality.

4. An optical communication device comprising:
a dummy light source that outputs dummy light;
a switch configured to output the dummy light from the dummy light source to either a first transmission line or a second transmission line, wherein
the dummy light source causes a light receiver to acquire first signal quality according to the dummy light being transmitted via a first transmission line,
the switch switches an output destination of the dummy light from the first transmission line to a second transmission line, and
the dummy light source causes the light-receiver to acquire second signal quality according to the dummy light being transmitted via the second transmission line;
a control transmitter configured to output an optical signal including information indicating the first signal quality acquired by the light-receiver to a terminal station via a control transmission line;
a brancher configured to branch the dummy light from the dummy light source; and
a multiplexer configured to multiplex the dummy light being branched by the brancher with the optical signal from the control transmitter and outputting the multiplexed light to the terminal station.

5. An optical communication method comprising:
at a first terminal station:
  outputting dummy light, from a dummy light source included in the first terminal station, to a first transmission line;
  acquiring first signal quality from the dummy light being received via the first transmission line;
  switching an output destination of the dummy light from the first transmission line to a second transmission line; and
  acquiring second signal quality from the dummy light being received via the second transmission line;
at a second terminal station:
  outputting dummy light from a dummy light source included in the second terminal station toward the first terminal station via either a third transmission line or a fourth transmission line;
the method further comprising:
  acquiring, at the first terminal station signal quality of dummy light being received from the second terminal station via either the third transmission line or the fourth transmission line;
  connecting the first termination station to the second termination station;
  the second terminal station outputting, from a control transmitter, an optical signal including information indicating the first signal quality acquired by the second terminal station to the first terminal station via the control transmission line, and
  adjusting intensity of the dummy light output by the dummy light source included in the first terminal station, based on information indicating the first signal quality included in the optical signal;
  at the second terminal station branching the dummy light output from the dummy light source in the second terminal station, and
  multiplexing the dummy light being branched at the second terminal station with the optical signal from the control transmitter and outputting the multiplexed light to the first terminal station.

6. An optical communication method comprising:
outputting a dummy light from a dummy light source;
outputting, from a switch, the dummy light from the dummy light source to either a first transmission line or a second transmission line, wherein
  acquiring a first signal quality, from a light receiver, according to the dummy light being transmitted via a first transmission line,
the switch switching an output destination of the dummy light from the first transmission line to a second transmission line, and
acquiring a second signal quality, from the light receiver, according to the dummy light being transmitted via the second transmission line;
outputting, from a control transmitter, an optical signal including information indicating the first signal quality acquired by the light-receiver to a terminal station via a control transmission line;
branching the dummy light from the dummy light source; and
multiplexing the dummy light being branched with the optical signal from the control transmitter and outputting the multiplexed light to the terminal station.

\* \* \* \* \*